US010116812B2

United States Patent
Nakajima et al.

(10) Patent No.: US 10,116,812 B2
(45) Date of Patent: Oct. 30, 2018

(54) IMAGE FORMING APPARATUS, METHOD FOR CONTROLLING THE SAME, AND NON-TRANSITORY COMPUTER-READABLE DATA RECORDING MEDIUM HAVING CONTROL PROGRAM STORED THEREON

(71) Applicant: Konica Minolta, Inc., Chiyoda-ku, Tokyo (JP)

(72) Inventors: Hozuma Nakajima, Toyokawa (JP); Kenzo Yamamoto, Toyohashi (JP); Manabu Furukawa, Nagaokakyo (JP); Masao Hosono, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/942,212

(22) Filed: Nov. 16, 2015

(65) Prior Publication Data

US 2016/0142566 A1    May 19, 2016

(30) Foreign Application Priority Data

Nov. 18, 2014   (JP) .................................. 2014-233633

(51) Int. Cl.
H04N 1/00        (2006.01)
(52) U.S. Cl.
CPC ..... *H04N 1/00411* (2013.01); *H04N 1/00429* (2013.01); *H04N 1/00435* (2013.01)
(58) Field of Classification Search
CPC ........... H04N 1/00411; H04N 1/00435; H04N 1/00429

(Continued)

(56) References Cited

U.S. PATENT DOCUMENTS

| 2008/0307355 | A1 | 12/2008 | Yokota |
| 2010/0290068 | A1* | 11/2010 | Okada ................... G03G 15/50 358/1.9 |
| 2012/0019554 | A1 | 1/2012 | Narimatu et al. |

FOREIGN PATENT DOCUMENTS

| JP | 02-301819 A | 12/1990 |
| JP | 05-233189 A | 9/1993 |

(Continued)

OTHER PUBLICATIONS

Office Action (Notice of Grounds of Rejection) dated Nov. 29, 2016, by the Japanese Patent Office in corresponding Japanese Patent Application No. 2014-233633 and English translation of the Office Action. (12 pages).

(Continued)

*Primary Examiner* — Kent Yip
(74) *Attorney, Agent, or Firm* — Buchanan Ingersoll & Rooney PC

(57) ABSTRACT

There is provided an image forming apparatus capable of improving the operability at the time of transition from a currently-displayed image to another image as compared with the conventional technique. The image forming apparatus includes: a display unit; an operation accepting unit for accepting an operation indicating that display of an image currently displayed on the display unit is unnecessary; a generating unit for generating, based on the operation, a menu showing image candidates to which transition from the currently-displayed image can be made; a menu display unit for displaying the menu on the currently-displayed image; a selection accepting unit for accepting an operation for selecting a particular image from the candidates; and an image display unit for displaying the particular image on the display unit based on the operation for selecting.

19 Claims, 38 Drawing Sheets

(58) Field of Classification Search
USPC .......................................................... 358/1.15
See application file for complete search history.

(56) References Cited

FOREIGN PATENT DOCUMENTS

| | | |
|---|---|---|
| JP | 2008-305273 | 12/2008 |
| JP | 2010-019643 A | 1/2010 |
| JP | 2010-181983 A | 8/2010 |
| JP | 2011-107823 A | 6/2011 |
| JP | 2012-027725 | 2/2012 |

OTHER PUBLICATIONS

Notice of Grounds of Rejection dated Apr. 4, 2017 issued by the Japanese Patient Office in corresponding Japanese Patent Application No. 2014-233633 and English translation. (5 pages).

* cited by examiner

FIG.2A
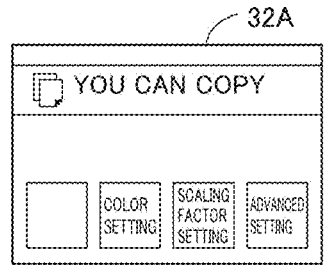
COPY IMAGE
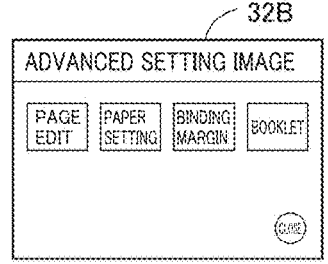
ADVANCED SETTING IMAGE
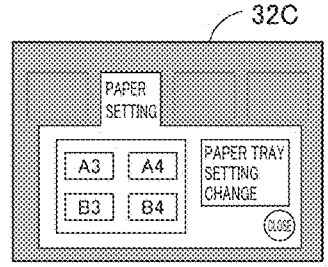
PAPER SETTING IMAGE
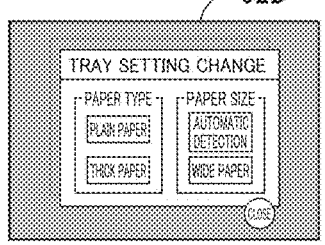
SELECTED TRAY SETTING CHANGE IMAGE
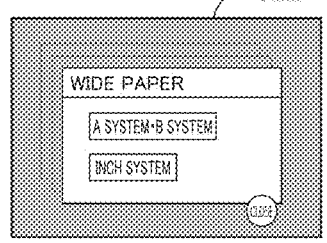
WIDE PAPER SETTING IMAGE

FIG.2B

| Screen | Label |
|---|---|
| 34A: SELECT ADDRESS (ADDRESS SEARCH, ADDRESS REGISTRATION, ONE-SIDE/DOUBLE-SIDE, RESOLUTION, COLOR) | SCAN IMAGE |
| 34B: ADDRESS REGISTRATION (No. | ADDRESS TYPE | ADDRESS, NEW INPUT, CLOSE) | ADDRESS REGISTRATION |
| 34C: ADDRESS INPUT (FAX, E-mail, FILE TRANSMISSION (FTP), CLOSE) | NEW INPUT |
| 34D: ADDRESS TYPE | FTP, REGISTERED NAME, READING OF REGISTERED NAME IN KANA, ADDRESS, CLOSE | FTP |
| 34E: FILE TRANSMISSION (FTP), HOST NAME, FILE PATH, PASSWORD, PORT NO. | FILE TRANSMISSION (FTP) |
| 34F: HOST NAME, CLEAR, keyboard, CLOSE | KEYBOARD |

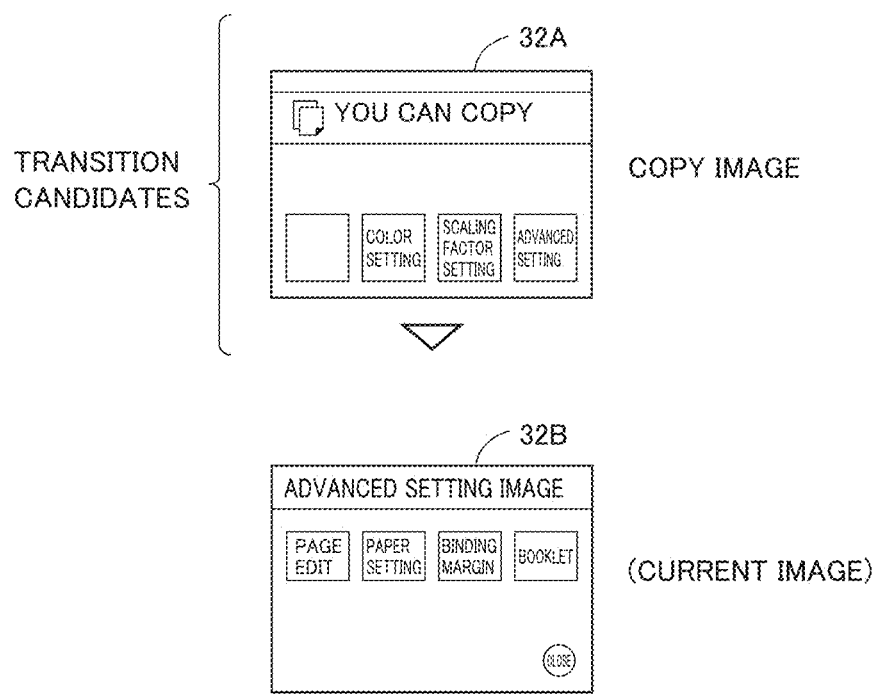

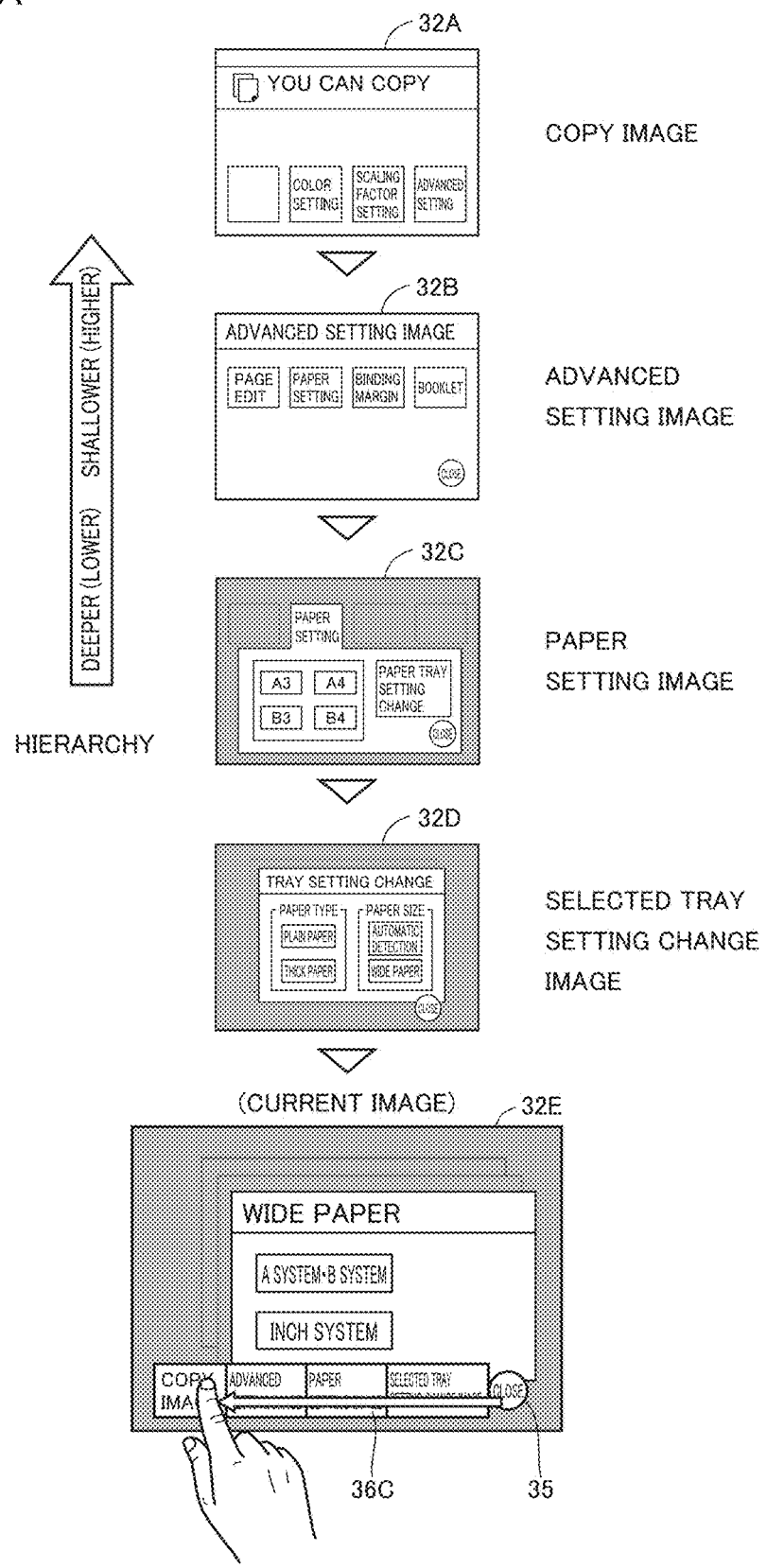

FIG.18A
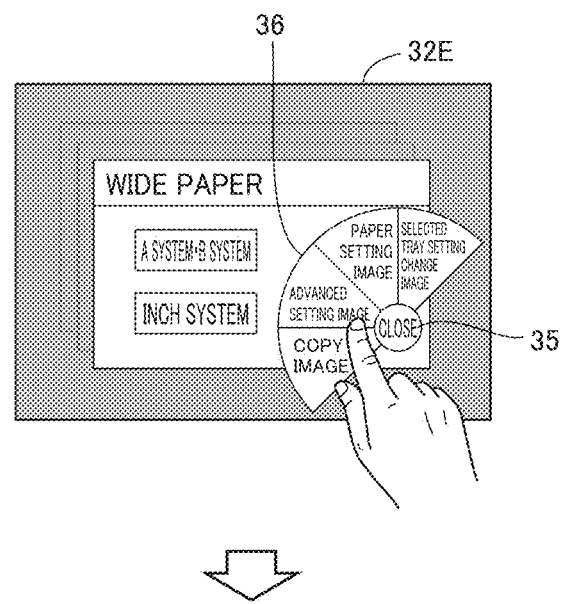
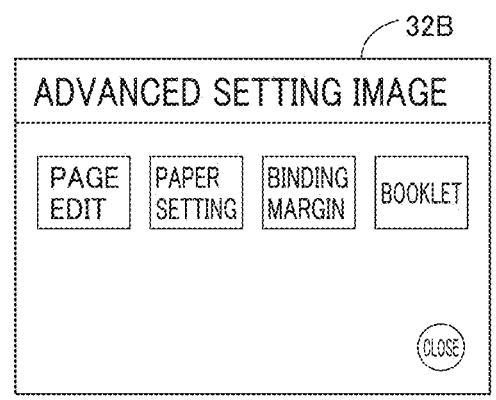

FIG.18C
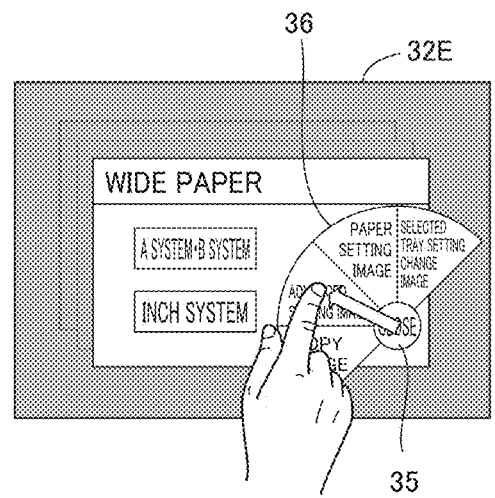
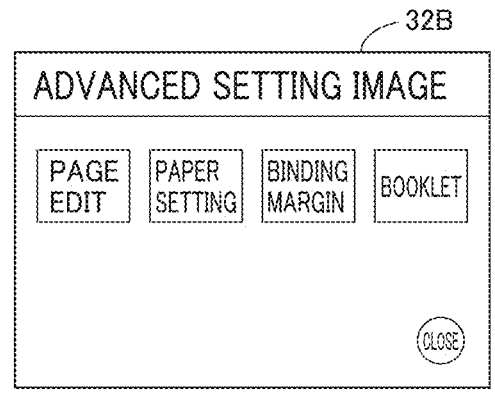

WHILE USER'S FINGER IS ON SELECTED ITEM, THUMBNAIL IMAGE OF THIS IMAGE IS DISPLAYED
→FIX WHEN FINGER IS RELEASED IN THIS STATE

FIG.21

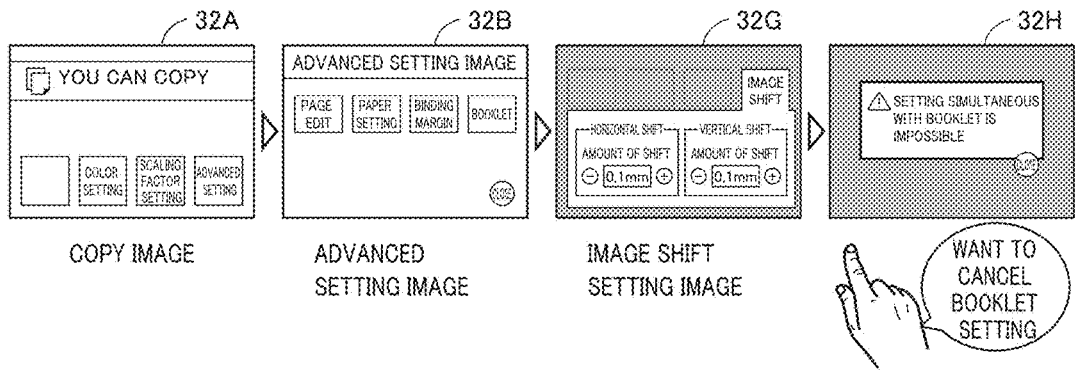

COPY IMAGE | ADVANCED SETTING IMAGE | IMAGE SHIFT SETTING IMAGE | WANT TO CANCEL BOOKLET SETTING

IN ADDITION TO IMAGES LOCATED IN HIGHER HIERARCHY, IMAGE TO WHICH TRANSITION IS HIGHLY LIKELY TO BE MADE NEXT EXISTS BASED ON CURRENT IMAGE AND SET VALUE

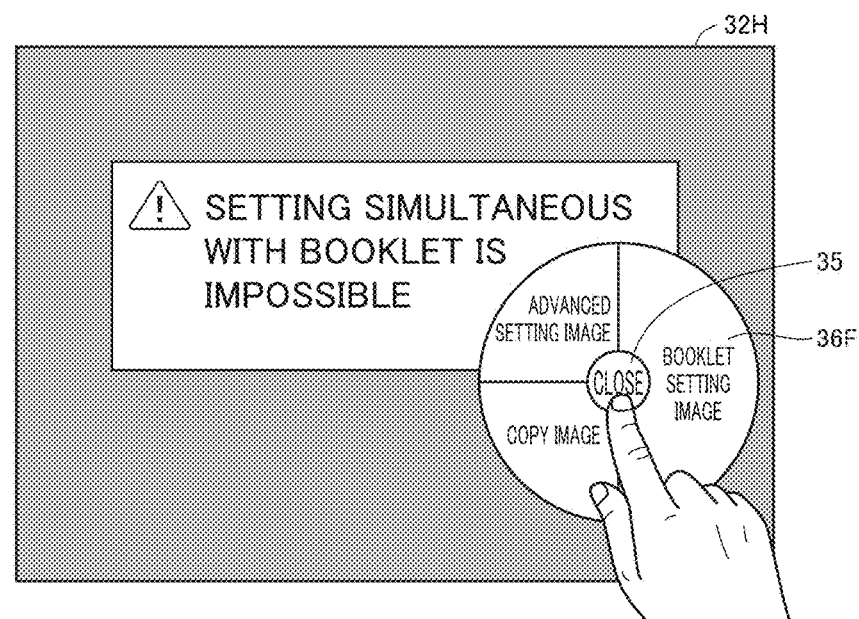

IN ADDITION TO IMAGES LOCATED IN HIGHER HIERARCHY, IMAGE TO WHICH TRANSITION IS HIGHLY LIKELY TO BE MADE NEXT EXISTS BASED ON CURRENT IMAGE AND SET VALUE

FIG.22

| DISPLAYED IMAGE | IMAGE TO WHICH TRANSITION IS HIGHLY LIKELY TO BE MADE NEXT | | |
|---|---|---|---|
| REGISTRATION SETTING IMAGE | SETTING CHECK IMAGE | COPY IMAGE | |
| INSERT PAGE SETTING IMAGE | INTER SHEET SETTING IMAGE | COVER SHEET SETTING IMAGE | ADVANCED SETTING IMAGE | COPY IMAGE |
| STAMP SETTING IMAGE | WATER MARK SETTING IMAGE | ADVANCED SETTING IMAGE | COPY IMAGE | |

| SETTING ITEM : SET VALUE | IMAGE TO WHICH TRANSITION IS HIGHLY LIKELY TO BE MADE NEXT | |
|---|---|---|
| BINDING MARGIN SETTING: ON | PUNCH SETTING IMAGE | |
| COLOR SETTING : GRAY SCALE | Nin1 SETTING IMAGE | IMAGE PRINTING SETTING IMAGE |
| BOOKLET SETTING : BOOKLET ON (DURING IMAGE SHIFT SETTING) | IMAGE SHIFT SETTING IMAGE | |

IMAGE FORMING APPARATUS, METHOD FOR CONTROLLING THE SAME, AND NON-TRANSITORY COMPUTER-READABLE DATA RECORDING MEDIUM HAVING CONTROL PROGRAM STORED THEREON

This application is based on Japanese Patent Application No. 2014-233633 filed with the Japan Patent Office on Nov. 18, 2014, the entire content of which is hereby incorporated by reference.

BACKGROUND OF THE INVENTION

Field of the Invention

The present disclosure relates to an image forming apparatus for controlling display of an image, a method for controlling the image forming apparatus, and a non-transitory computer-readable data recording medium having a control program stored thereon.

Description of the Related Art

In recent years, an image forming apparatus such as MFP (Multi-Functional Peripheral) having a display unit has been in widespread use. With the widespread use of the image forming apparatus, the functions of the image forming apparatus have become diverse. Therefore, before an intended function is invoked, a user must perform again and again the operation for switching the images on the display unit. The technique for improving such poor operability has been recently under development.

For example, Japanese Laid-Open Patent Publication No. 2008-305273 discloses an operation device designed to facilitate display switching. Japanese Laid-Open Patent Publication No. 2012-027725 discloses an image processing device designed to allow a user to perform the operation for switching the setting images quickly and with no stress.

The operation device disclosed in Japanese Laid-Open Patent Publication No. 2008-305273 displays, on an image, a button associated with each image, and when the user selects the button, the operation device displays the image corresponding to the selected button. As a result, the user can perform switching to the intended image. However, the operation device cannot display the information indicating which image each button is associated with. Therefore, the user cannot understand, at a glance, which button should be selected to display the intended image.

When a plurality of images are displayed, the image processing device disclosed in Japanese Laid-Open Patent Publication No. 2012-027725 displays buttons for closing the plurality of images, in such a manner that the buttons are overlapped with one another at the same position. By successively pressing the close buttons displayed at the same position, the user causes the image processing device to display the intended image. This can save user's time and effort to search for the close buttons on the images. However, every time the image is closed, the user must check whether or not the displayed image is the intended image, which requires time and effort.

SUMMARY OF THE INVENTION

In an image forming apparatus according to one embodiment, the operability at the time of transition from the currently-displayed image (hereinafter also referred to as "displayed image") to another image is improved as compared with the conventional technique.

According to one embodiment, an image forming apparatus includes: a display unit; an operation accepting unit for accepting an operation indicating that display of an image currently displayed on the display unit is unnecessary; a generating unit for generating, based on the operation, a menu showing image candidates to which transition from the currently-displayed image can be made; a menu display unit for displaying the menu on the currently-displayed image; a selection accepting unit for accepting an operation for selecting a particular image from the candidates; and an image display unit for displaying the particular image on the display unit based on the operation for selecting.

Preferably, based on acceptance of the operation indicating that display of the currently-displayed image is unnecessary, the image display unit closes the currently-displayed image.

Preferably, the currently-displayed image and the image candidates to which transition from the currently-displayed image can be made have a hierarchical relationship.

Preferably, the generating unit generates the menu showing, as the candidates, an image located in a higher hierarchy than that of the currently-displayed image.

Preferably, the operation indicating that display of the currently-displayed image is unnecessary includes an operation for causing transition from a hierarchy of the currently-displayed image to another hierarchy to take place.

Preferably, the images displayed on the display unit are displayed in such a manner that at least a part thereof are overlapped with one another.

Preferably, the menu display unit displays the menu on the display unit when the number of the candidates is equal to or larger than a prescribed number, and does not display the menu on the display unit when the number of the candidates is smaller than the prescribed number.

Preferably, the operation accepting unit includes a button for accepting the operation indicating that display of the currently-displayed image is unnecessary. The image forming apparatus further includes a measuring unit for measuring a time period during which the button is pressed. The menu display unit displays the menu on the display unit when the time period is equal to or longer than a prescribed time period, and does not display the menu on the display unit when the time period is shorter than the prescribed time period.

Preferably, the menu display unit displays the menu near a position where the operation indicating that display of the currently-displayed image is unnecessary was accepted.

Preferably, the menu display unit displays the candidates radially about the position.

Preferably, the currently-displayed image and the image candidates to which transition from the currently-displayed image can be made have a hierarchical relationship. The menu display unit displays the image candidates such that an image candidate having the more distant hierarchical relationship, of the image candidates shown in the menu, is more distant from the position.

Preferably, the operation for selecting a particular image includes at least one of a drag operation and a tap operation.

Preferably, the operation accepting unit is configured to accept an operation for provisionally selecting a particular image from the image candidates shown in the menu, and thereafter, accept an operation for determining the particular image as an image displayed on the display unit. The menu display unit displays a thumbnail of the particular image on the display unit while the particular image is provisionally selected.

Preferably, the image forming apparatus further includes: a storage unit for storing first image information that associates an image candidate to which transition is highly likely to be made with each image, and second image information that associates an image candidate to which transition is highly likely to be made with each set value set in the image forming apparatus; and an identifying unit for identifying the image associated with the currently-displayed image based on the first image information, and identifying the image associated with the set value set in the image forming apparatus based on the second image information. The generating unit generates the menu by using, as the candidates, the image identified by the identifying unit based on the first image information and the image identified by the identifying unit based on the second image information.

Preferably, the menu display unit displays the image candidates such that an image candidate that is more likely to be selected by a user, of the image candidates shown in the menu, is easier to be visually recognized than the other image candidates.

Preferably, the menu display unit displays the image candidates such that an image candidate that is less likely to be selected by a user, of the image candidates shown in the menu, is more difficult to be visually recognized than the other image candidates.

According to another embodiment, a method for controlling an image forming apparatus including a display unit, includes: accepting an operation indicating that display of an image currently displayed on the display unit is unnecessary; generating, based on the operation, a menu showing image candidates to which transition from the currently-displayed image can be made; displaying the menu on the currently-displayed image; accepting an operation for selecting a particular image from the candidates; and displaying the particular image on the display unit based on the operation for selecting.

According to still another embodiment, a non-transitory computer-readable data recording medium having a control program stored thereon is provided. The program causes the computer to execute: accepting an operation indicating that display of an image currently displayed on the display unit is unnecessary; generating, based on the operation, a menu showing image candidates to which transition from the currently-displayed image can be made; displaying the menu on the currently-displayed image; accepting an operation for selecting a particular image from the candidates; and displaying the particular image on the display unit based on the operation for selecting.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A, 2B, 3, and 4 are diagrams showing one example of image transition of the image forming apparatus according to a first embodiment.

FIGS. 10A and 10B are diagrams showing specific examples of image candidates to which transition from the current image can be made.

FIGS. 16A and 16B are diagrams showing specific examples of a display manner of the menu when the candidates shown in the menu are prioritized.

FIGS. 18A-18D are diagrams showing specific examples of the selection operation in the menu.

FIG. 21 is a diagram showing a specific example of the display manner of the menu in an image forming apparatus according to a ninth embodiment.

FIG. 22 is a diagram showing one example of a data structure of an image table.

FIG. 23 is a diagram showing one example of a data structure of a set value table.

DESCRIPTION OF THE PREFERRED EMBODIMENTS

Figure 1:
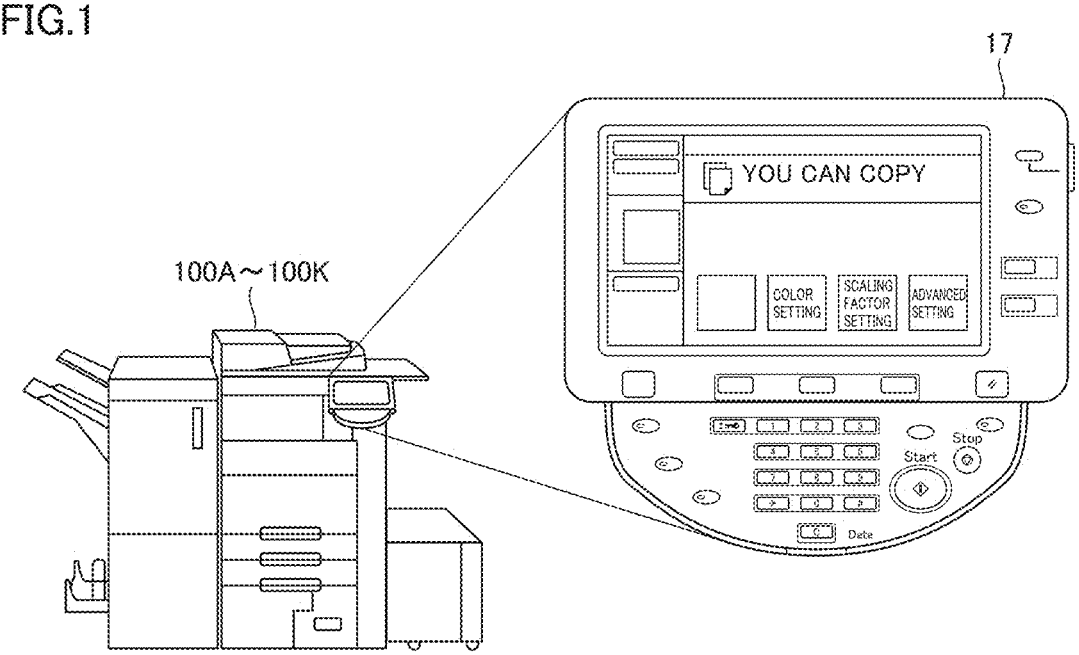
FIG. 1 is a diagram showing an external appearance of an image forming apparatus configured as the MFP.

Embodiments according to the present invention will be described hereinafter with reference to the drawings. In the following description, the same parts and components are denoted by the same reference characters. Their names and functions are also the same. Therefore, detailed description of them will not be repeated.

In the following description, the MFP functioning as a digital complex machine including the scanner function, the copy function and the printer function will be described as one example of the image forming apparatus. However, the image forming apparatus is not limited to the MFP. The image forming apparatus may include, for example, a tablet terminal, a personal computer, a digital camera, an electronic dictionary, a PDA (Personal Digital Assistant), a game console, and any other device having a display unit. Embodiments described below may be selectively combined as appropriate.

First Embodiment

[Overview]

Figure 3:
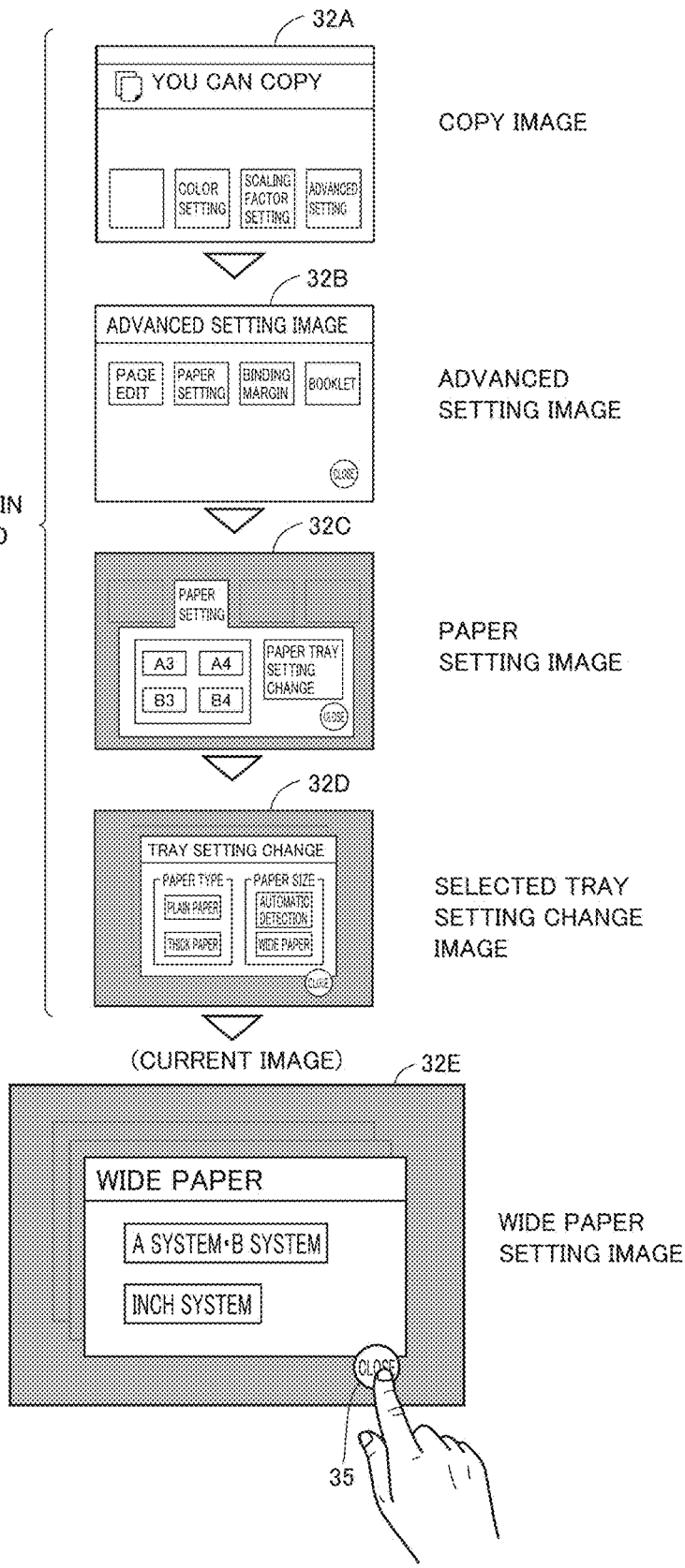
Figure 4:
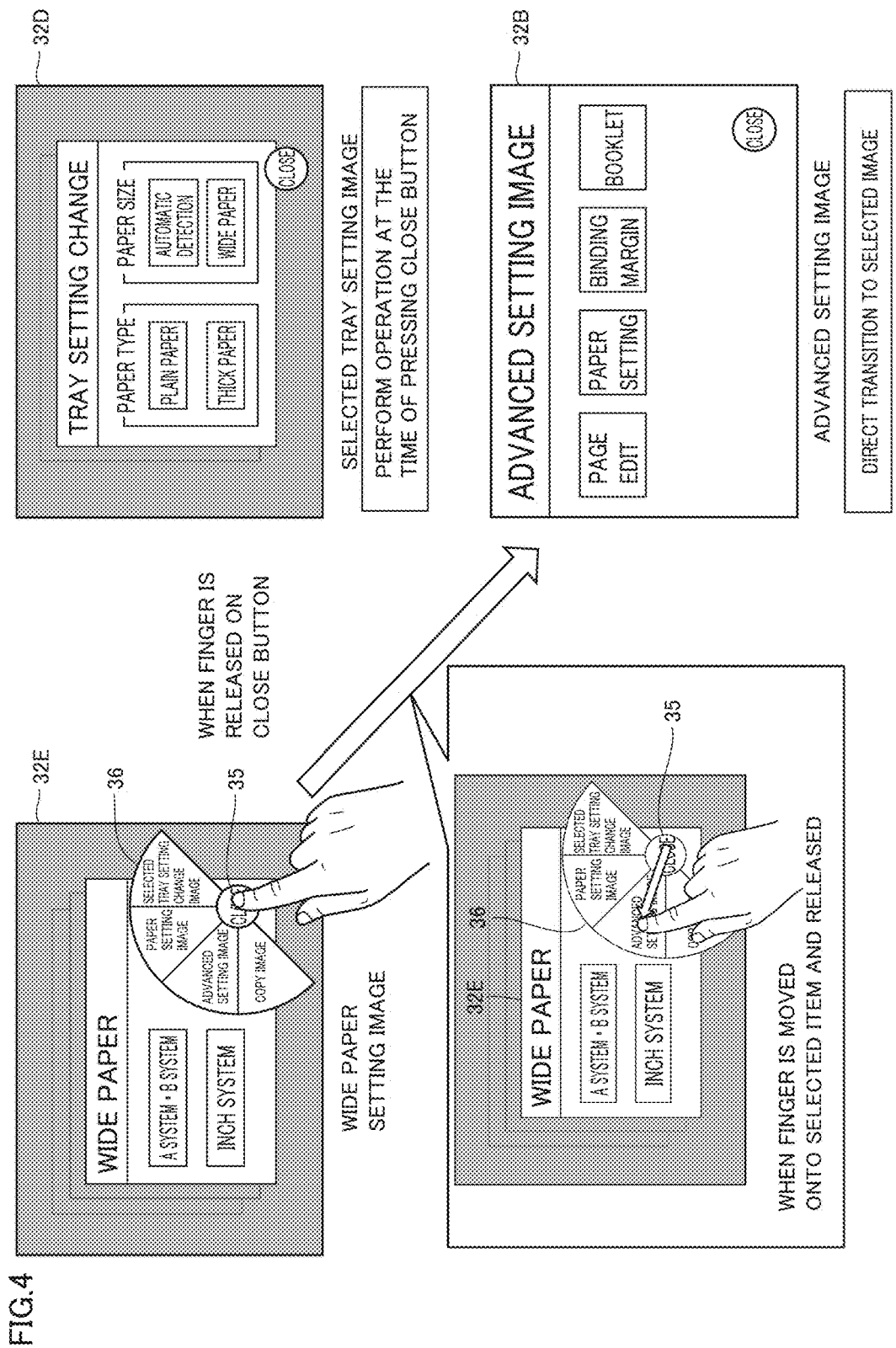

An overview of an image forming apparatus 100A according to a first embodiment will be described with reference to FIGS. 1 to 4. FIG. 1 is a diagram showing an external appearance of image forming apparatus 100A configured as the MFP. FIGS. 2 to 4 are diagrams showing one example of image transition of image forming apparatus 100A. As shown in FIG. 1, image forming apparatus 100A has an operation panel 17 configured as a touch panel. Image forming apparatus 100A executes the functions such as the scanner function, the copy function and the printer function in accordance with the user operation of operation panel 17.

FIG. 2A shows one example of image transition on operation panel 17 when the user invokes the copy function of image forming apparatus 100A. In FIG. 2A, the user sequentially opens images 32A to 32E and performs setting for the copy function in each image. FIG. 2B shows one example of image transition on operation panel 17 when the user invokes the scanner function of image forming apparatus 100A. In FIG. 2B, the user sequentially opens images 34A to 34F and performs setting for transmitting scan data in each image.

As described above, before the user executes an intended function, image forming apparatus 100A displays many images. As the number of the displayed images increases, the user must perform again and again the operation for closing the images when returning display to the previous image. For example, when the user returns display to image 32A in the case where image 32E is currently opened, the user must perform the operation for sequentially closing images 32E, 32D, 32C, and 32B.

Thus, when accepting, from the user, an operation indicating that display of currently-displayed image 32E is unnecessary (hereinafter also referred to as "unnecessary operation") as shown in FIG. 3, image forming apparatus 100A according to the present embodiment displays a menu 36 showing image candidates to which transition from currently-displayed image 32E can be made, as shown in FIG. 4. The unnecessary operation includes, for example, an operation for closing currently-displayed image 32E. As one example of the unnecessary operation, FIG. 3 shows an operation for pressing a button 35 for closing image 32E. Each image candidate shown in menu 36 is displayed in a user identifiable manner by the character information indicating, for example, a name, an ID (Identification) and the like of the image.

When the user releases his/her finger on button 35, image forming apparatus 100A closes image 32E and displays image 32D that precedes image 32E by one image. On the other hand, when the user releases his/her finger on any one of the image candidates displayed in menu 36, i.e., when the user selects a particular image from the image candidates displayed in menu 36, image forming apparatus 100A displays the selected image. FIG. 4 shows an example of the case in which the item corresponding to image 32B (advanced setting image) in menu 36 is selected. At this time, image forming apparatus 100A preferably closes current image 32E based on the unnecessary operation.

As described above, in accordance with the unnecessary operation, the user can perform switching to the intended image by the single operation for selecting any one of the image candidates shown in menu 36, and thus, the user can easily perform the operation for image switching. In addition, the images to which transition from the current image can be made are displayed as the menu, and thus, the user can understand, at a glance, the images to which transition from the current image can be made.

[Hardware Configuration]

Figure 5:
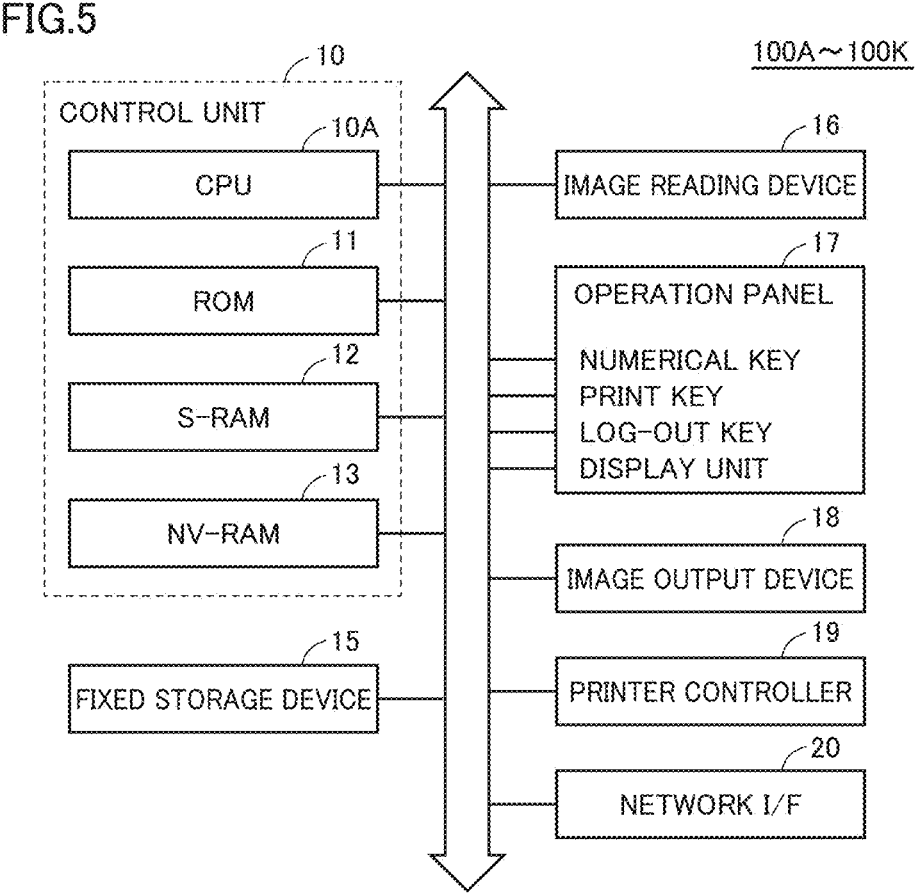
FIG. 5 is a block diagram showing a main hardware configuration of the image forming apparatus according to the first embodiment.

One example of a hardware configuration of image forming apparatus 100A according to the first embodiment will be described with reference to FIG. 5. FIG. 5 is a block diagram showing a main hardware configuration of image forming apparatus 100A.

As shown in FIG. 5, image forming apparatus 100A includes a control unit 10. Control unit 10 includes a CPU (Central Processing Unit) 10A for controlling the entire device, an ROM (Read Only Memory) 11 that is a memory for storing a control program, an S-RAM (Static Random Access Memory) 12 that is a memory forming a working storage area, and a battery-backed-up NV-RAM (Non-Volatile Random Access Memory) 13 for storing various settings involved in image forming.

An image reading device 16, operation panel 17, a network I/F (interface) 20 for receiving and transmitting various types of information to and from the other devices connected via a not-shown communication network, a printer controller 19 for generating a copy image from print data received by network I/F 20, and an image output device 18 for forming the copy image on a paper are connected to control unit 10 via a bus.

Operation panel 17 includes keys and a display unit for doing various inputs, and has the display unit that is a touch panel, and a key switch group such as a numeric key, a print key and a log-out key. In the present embodiment, the touch panel and the key switch group of operation panel 17 accept the operation indicating that display of the image currently displayed on the display unit is unnecessary (i.e., the unnecessary operation), and accept an operation for selecting a particular image from the image candidates shown in menu 36 (see FIG. 4) (hereinafter also referred to as "selection operation").

A fixed storage device 15 is also connected to control unit 10 via the bus. Fixed storage device 15 includes, for example, a storage device such as a hard disk device.

[Functional Configuration]

Figure 6:
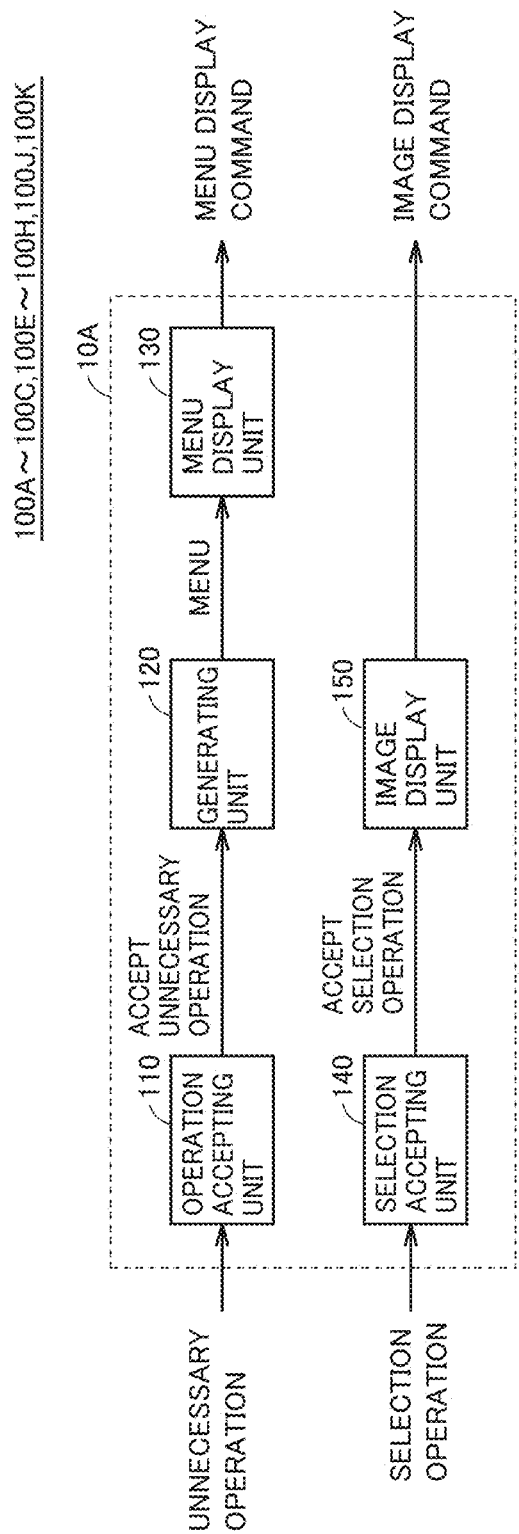
FIG. 6 is a block diagram showing one example of a functional configuration of the image forming apparatus according to the first embodiment.

A function of image forming apparatus 100A will be described with reference to FIG. 6. FIG. 6 is a block diagram showing one example of a functional configuration of image forming apparatus 100A. As shown in FIG. 6, CPU 10A (see FIG. 5) of image forming apparatus 100A includes an operation accepting unit 110, a generating unit 120, a menu display unit 130, a selection accepting unit 140, and an image display unit 150.

Operation accepting unit 110 accepts the operation indicating that display of the image currently displayed on operation panel 17 (see FIG. 5) is unnecessary (i.e., the unnecessary operation). In an aspect, the unnecessary operation includes the operation for closing the displayed image. As one example, the operation for closing the displayed image includes an operation for pressing the close button, an operation for pressing an OK button, an operation for pressing a cancel button, and the like. In another aspect, the unnecessary operation includes an operation for hiding the displayed image without closing the displayed image. As one example, the operation for hiding the displayed image includes a flick operation as page turning, a touch operation outside the displayed image for rendering the displayed image inactive, and the like.

Generating unit 120 generates the menu showing the image candidates to which transition from the displayed image can be made, when operation accepting unit 110 accepts the unnecessary operation. Menu display unit 130 displays the menu generated by generating unit 120 on the displayed image. The details of a display manner of the menu will be described below.

Selection accepting unit 140 accepts the operation for selecting a particular image from the image candidates displayed in the menu (i.e., the selection operation). The details of the selection operation in the menu will be described below. Image display unit 150 displays the image selected from the menu on operation panel 17. In an aspect, image display unit 150 closes the displayed image based on operation accepting unit 110 accepting the unnecessary operation.

[Control Structure]

Figure 7:
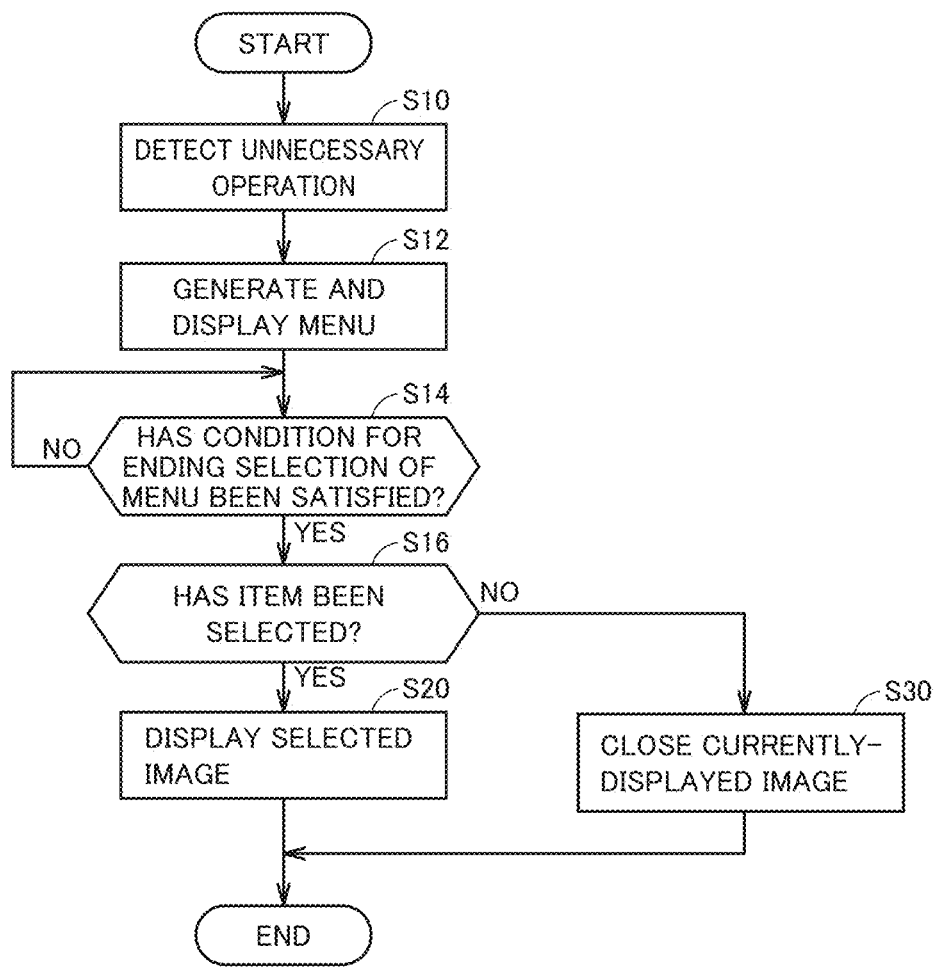
FIG. 7 is a flowchart showing a part of a process executed by the image forming apparatus according to the first embodiment.

A control structure of image forming apparatus 100A will be described with reference to FIG. 7. FIG. 7 is a flowchart showing a part of a process executed by image forming apparatus 100A. The process in FIG. 7 is implemented by CPU 10A (see FIG. 5) of image forming apparatus 100A executing a program. In another aspect, a part or all of the process may be executed by a circuit element or the other hardware.

In step S10, CPU 10A as operation accepting unit 110 (see FIG. 6) detects the operation indicating that display of the image currently displayed on operation panel 17 (see FIG. 5) (i.e., the displayed image) is unnecessary (i.e., the unnecessary operation).

In step S12, CPU 10A as generating unit 120 (see FIG. 6) generates the menu showing the image candidates to which transition from the displayed image can be made. In addition, in step S12, CPU 10A as menu display unit 130 (see FIG. 6) displays the generated menu on operation panel 17.

In step S14, CPU 10A determines whether or not a condition for ending selection of the menu has been satisfied. As one example, the condition for ending selection of the menu includes elapse of a certain time period without any operation after the menu is displayed, releasing of the user's finger from the touch panel, pressing of the button for closing the menu or the OK button, and the like. If the condition for ending selection of the menu has been satisfied (YES in step S14), CPU 10A switches control to step S16. If not (NO in step S14), CPU 10A executes the process in step S14 again.

In step S16, CPU 10A as selection accepting unit 140 (see FIG. 6) determines whether or not the item in the menu has been selected. If CPU 10A determines that the item in the menu has been selected (YES in step S16), CPU 10A switches control to step S20. If not (NO in step S16), CPU 10A switches control to step S30.

In step S20, CPU 10A as image display unit 150 displays the image selected from the menu on operation panel 17. In step S30, CPU 10A executes the operation for closing the currently-displayed image (i.e., the displayed image). The operation for closing the displayed image includes returning to the previous image, erasing the displayed image, and changing the preceding/succeeding relationship between the displayed image and the image located by one image under the displayed image.

[Summary]

As described above, image forming apparatus 100A according to the present embodiment accepts the unnecessary operation and displays, as the menu, the image candidates to which transition from the current image can be made, and thus, the user can understand, at a glance, the images to which transition from the current image can be made. In addition, the user can cause operation panel 17 to display the intended image by the single operation for selecting the item in the menu. Furthermore, image forming apparatus 100A displays the menu based on the unnecessary operation by the user, and thus, it is unnecessary to constantly display the menu. Therefore, image forming apparatus 100A can save the display space.

Second Embodiment

[Hierarchical Relationship Among Images]

In image forming apparatus 100A according to the first embodiment, the correspondence relationship between the displayed image and the images to which transition from the displayed image can be made has not been particularly limited. In contrast, in an image forming apparatus 100B according to a second embodiment, the displayed image and the images to which transition from the displayed image can be made have a hierarchical relationship.

Figure 8:
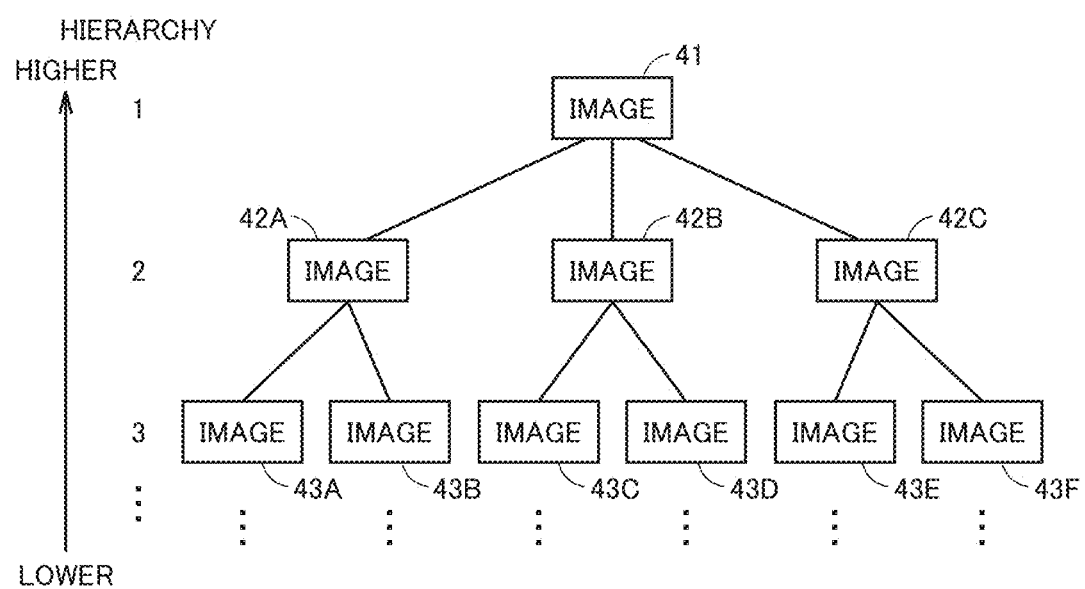
FIG. 8 is a conceptual diagram schematically showing a hierarchical relationship of images displayed on an image forming apparatus according to a second embodiment.

An overview of image forming apparatus 100B according to the second embodiment will be described below with reference to FIG. 8. FIG. 8 is a conceptual diagram schematically showing the hierarchical relationship among the images displayed on image forming apparatus 100B. Since the remaining points such as a hardware configuration of image forming apparatus 100B are the same as those of image forming apparatus 100A according to the first embodiment, description thereof will not be repeated.

The images displayed on image forming apparatus 100B are hierarchically associated with one another. In an example shown in FIG. 8, an image 41 located in a highest first hierarchy is associated with images 42A to 42C located in a second hierarchy. Image 42A located in the second hierarchy is associated with images 43A and 43B located in a third hierarchy. Image 42B located in the second hierarchy is associated with images 43C and 43D located in the third hierarchy. Image 42C located in the second hierarchy is associated with images 43E and 43F located in the third hierarchy.

In this manner, the hierarchical relationship exists among the images and image forming apparatus 100B causes image transition to take place in the hierarchical order in accordance with the user operation. Namely, image forming apparatus 100B sequentially displays a series of images having the hierarchical relationship in accordance with the user operation. Each image displayed on image forming apparatus 100B is displayed as, for example, a popup window. In addition, the images displayed on image forming apparatus 100B are displayed in such a manner that at least a part thereof are overlapped with one another. As a result, image forming apparatus 100B can save the display space.

As described above, when accepting the unnecessary operation, generating unit 120 (see FIG. 6) generates the menu showing the image candidates to which transition from the currently-displayed image (i.e., the displayed image) can be made. At this time, generating unit 120 includes, in the menu, the images having the hierarchical relationship with the displayed image. For example, when image 42A is displayed as the current image, generating unit 120 includes a series of images (i.e., images 41, 43A and 43B) having the hierarchical relationship with image 42A in the menu as the images to which transition from image 42A can be made. Since the images having the hierarchical relationship with the current image are included in the menu as described above, the image candidates that can be displayed by a series of user operation can be displayed in the menu. As a result, image forming apparatus 100B can display, in the menu, the image candidates that are highly likely to be selected by the user, and thus, the operability at the time of image switching can be enhanced.

In addition, when the user performs the operation for closing the displayed image, there is a high possibility that the user intends to cause image forming apparatus 100B to display an image displayed prior to the current image, i.e., an image located in a higher hierarchy than that of the current image. Therefore, generating unit 120 preferably generates the menu showing only the images located in a higher hierarchy than that of the displayed image as the image candidates to which transition can be made. For example, when image 43A is displayed as the displayed image, generating unit 120 includes, in the menu, images 41 and 42A located in a higher hierarchy than that of image 43A. Since generating unit 120 includes, in the menu, only the images that are highly likely to be selected by the user as described above, the operability at the time of image switching can be further enhanced in image forming apparatus 100B.

[Control Structure]

Figure 9:
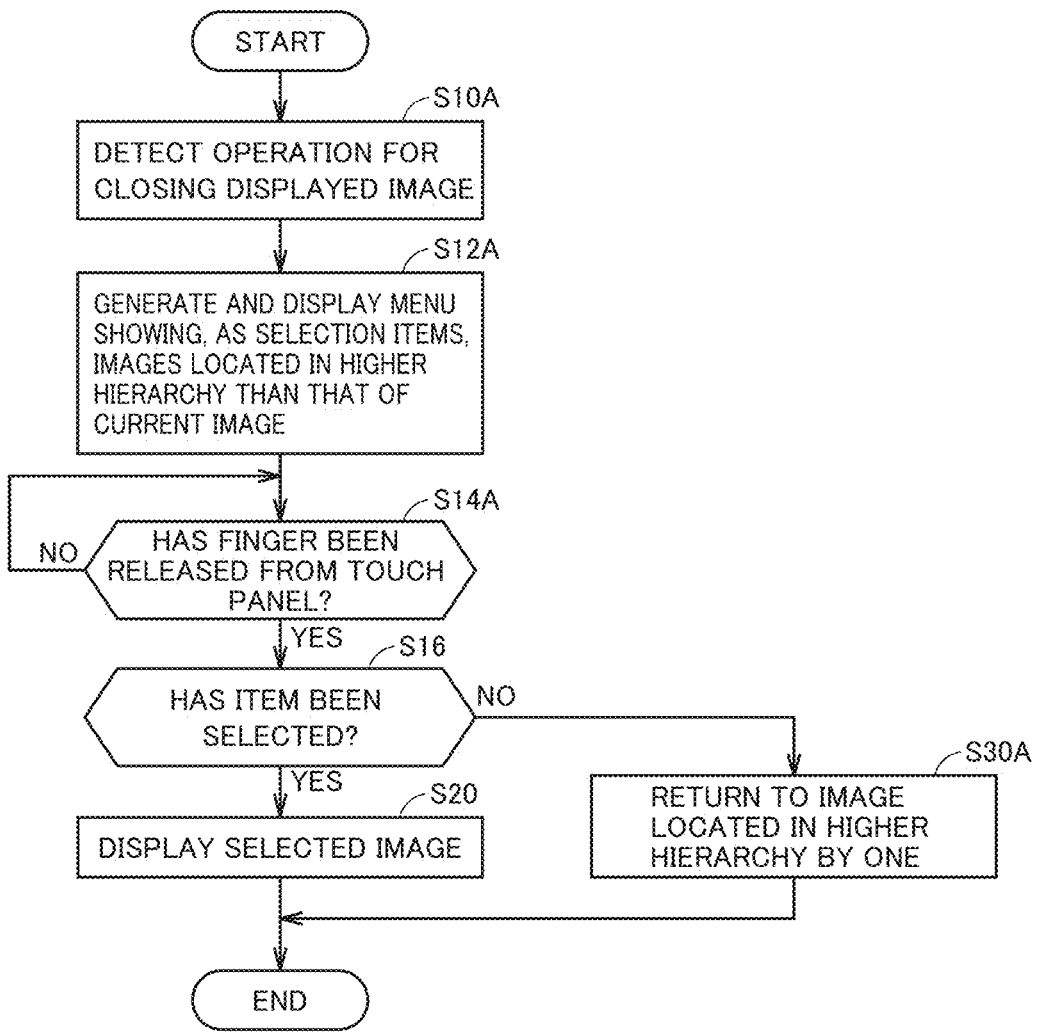
FIG. 9 is a flowchart showing a part of a process executed by the image forming apparatus according to the second embodiment.

A control structure of image forming apparatus 100B will be described with reference to FIG. 9. FIG. 9 is a flowchart showing a part of a process executed by image forming apparatus 100B. The process in FIG. 9 is implemented by CPU 10A (see FIG. 5) of image forming apparatus 100B executing a program. In another aspect, a part or all of the process may be executed by a circuit element or the other hardware.

In step S10A, CPU 10A as operation accepting unit 110 (see FIG. 6) detects an operation for making transition from the hierarchy of the displayed image to another hierarchy, which is one example of the unnecessary operation. For example, this operation includes the operation for pressing the button for closing the displayed image. In step S12A, CPU 10A as generating unit 120 (see FIG. 6) generates the menu showing the images located in a higher hierarchy than that of the displayed image as the image candidates to which transition can be made.

In step S14A, CPU 10A determines whether or not the user's finger has been released from operation panel 17 (see FIG. 5) configured as the touch panel. For example, based on the fact that the previously-detected touch operation becomes undetected, CPU 10A determines that the user's finger has been released from operation panel 17. If CPU 10A determines that the user's finger has been released from operation panel 17 (YES in step S14A), CPU 10A switches control to step S16. If not (NO in step S14A), CPU 10A executes the process in step S14A again.

Since the process in steps S16 and S20 is the same as the process shown in FIG. 7, description will not be repeated. In step S30A, CPU 10A displays the image located in a higher hierarchy by one than that of the displayed image.

[Summary]

As described above, image forming apparatus 100B according to the present embodiment displays the images having the hierarchical relationship with the displayed image or the images located in a higher hierarchy than that of the displayed image in the menu as the candidates to which transition can be made. Therefore, only the image candidates that are highly likely to be selected by the user can be included in the menu, and thus, the operability at the time of image switching can be further enhanced.

Third Embodiment

[Overview]

Image forming apparatus 100A according to the first embodiment has constantly displayed the menu based on the acceptance of the unnecessary operation. In contrast, an image forming apparatus 100C according to a third embodiment does not display the menu when the number of image candidates to which transition from the displayed image can be made is small.

Figure 10A:
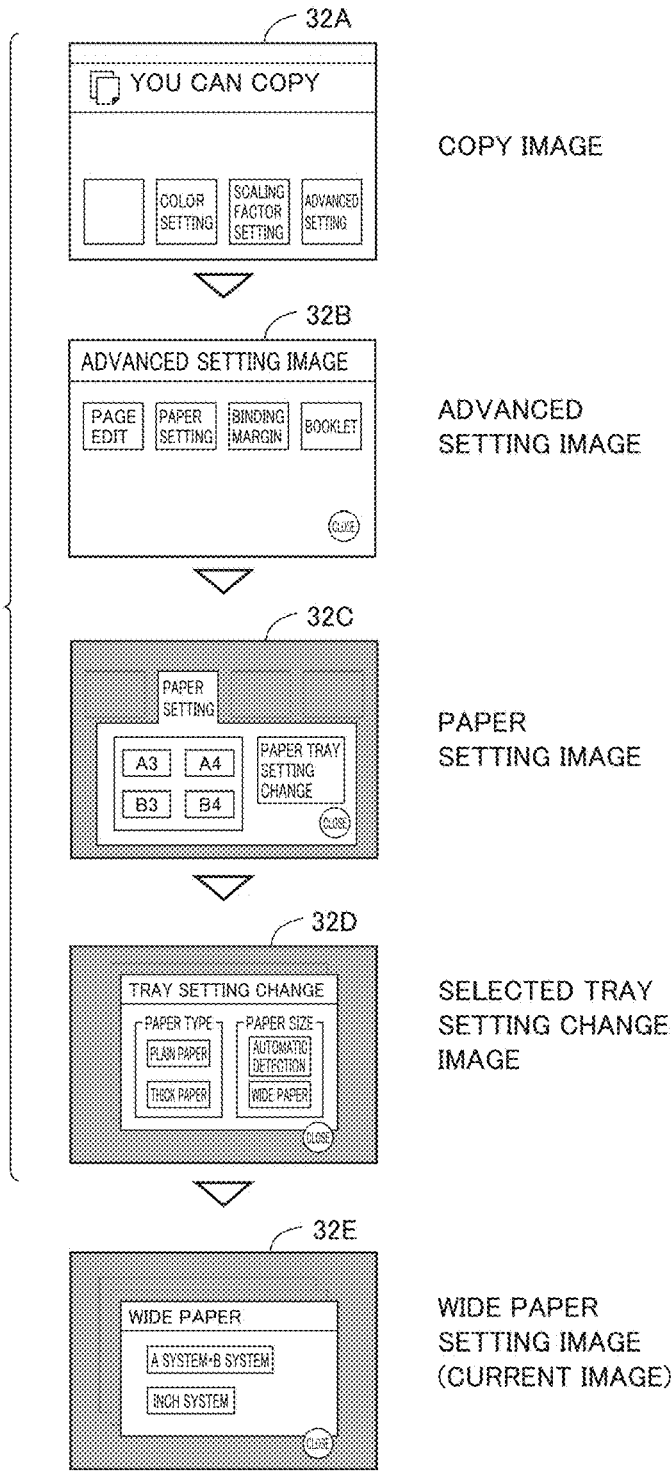

An overview of image forming apparatus 100C according to the third embodiment will be described below with reference to FIGS. 10A and 10B. FIGS. 10A and 10B are diagrams showing specific examples of image candidates to which transition from the current image can be made. Since the remaining points such as a hardware configuration of image forming apparatus 100C are the same as those of image forming apparatus 100A according to the first embodiment, description thereof will not be repeated.

When the number of image candidates to which transition from the currently-displayed image (i.e., the displayed image) can be made is small, the user has a little choice of the candidates even if the menu is displayed. Particularly when the image to which transition from the displayed image can be made is the only one image, display of the menu increases time and effort to select the menu. In order to improve such poor operability, image forming apparatus 100C according to the present embodiment does not display the menu when the number of image candidates to which transition from the displayed image can be made is smaller than a prescribed number.

As the more specific process, when accepting the unnecessary operation, image forming apparatus 100C identifies the number of image candidates to which transition from the displayed image can be made. As one example, the number of images located in a higher hierarchy than that of the displayed image is identified as the number of image candidates to which transition can be made. Alternatively, the number of images shown in a candidate table 54 (see FIG. 24) described below is identified as the number of image candidates to which transition can be made. Menu display unit 130 (see FIG. 6) displays the menu on operation panel 17 (see FIG. 5) when the identified number of candidates is equal to or larger than the prescribed number. In addition, menu display unit 130 does not display the menu on operation panel 17 when the identified number of candidates is smaller than the prescribed number.

For example, a threshold value for determining whether to display the menu or not is assumed to be two images. In this case, in FIG. 10A, the image candidates to which transition from currently-displayed image 32E can be made are four images, i.e., images 32A to 32D. Therefore, when accepting the unnecessary operation, image forming apparatus 100C displays the menu showing images 32A to 32D as selection items. In contrast, in FIG. 10B, the image candidate to which transition from currently-displayed image 32B can be made is one image, i.e., image 32A. Therefore, even when accepting the unnecessary operation, image forming apparatus 100C does not display the menu.

[Control Structure]

Figure 11:
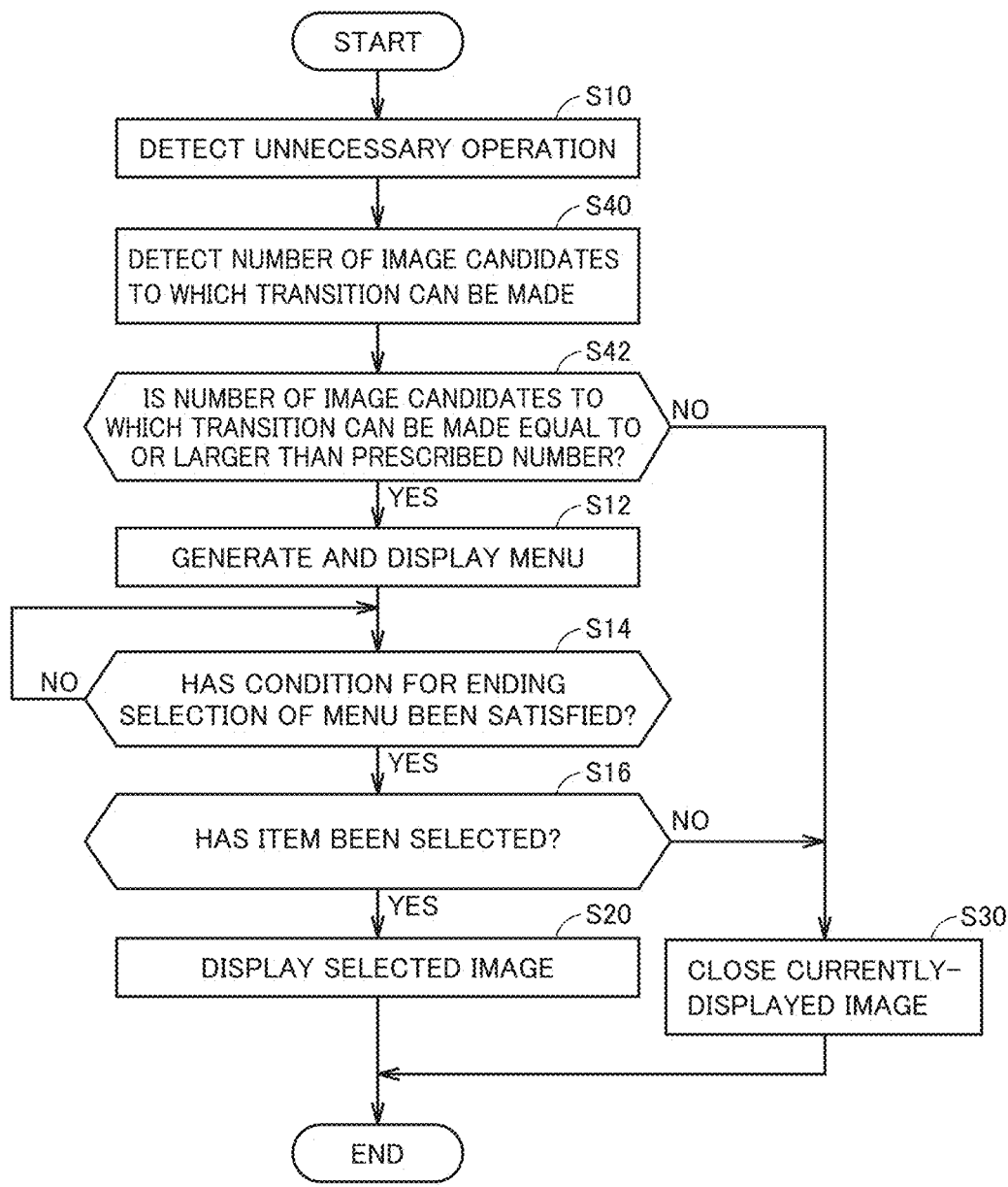
FIG. 11 is a flowchart showing a part of a process executed by an image forming apparatus according to a third embodiment.

A control structure of image forming apparatus 100C will be described with reference to FIG. 11. FIG. 11 is a flowchart showing a part of a process executed by image forming apparatus 100C. The process in FIG. 11 is implemented by CPU 10A (see FIG. 5) of image forming apparatus 100C executing a program. In another aspect, a part or all of the process may be executed by a circuit element or the other hardware. Since the process in the steps other than steps S40 and S42 shown in FIG. 11 is the same as the process shown in FIG. 7, description will not be repeated.

In step S40, CPU 10A identifies the number of image candidates to which transition from the displayed image can be made. As one example, CPU 10A identifies the number of images located in a higher hierarchy than that of the displayed image as the number of image candidates to which transition can be made. Alternatively, CPU 10A identifies the number of images shown in candidate table 54 (see FIG. 24) described below as the number of image candidates to which transition can be made. Alternatively, CPU 10A identifies a total of the number of images located in a higher hierarchy than that of the displayed image and the number of images shown in candidate table 54 described below as the number of image candidates to which transition can be made.

In step S42, CPU 10A determines whether or not the number of image candidates to which transition from the displayed image can be made is equal to or larger than the prescribed number. If CPU 10A determines that the number of image candidates to which transition from the displayed image can be made is equal to or larger than the prescribed number (YES in step S42), CPU 10A switches control to step S12. If not (NO in step S42), CPU 10A switches control to step S30.

[Summary]

As described above, when the number of image candidates to which transition from the displayed image can be made is small, image forming apparatus 100C according to the present embodiment does not display the menu even when image forming apparatus 100C according to the present embodiment accepts the unnecessary operation. As a result, when the user has a little choice of the candidates, image forming apparatus 100C can save user's time and effort to select the menu.

Fourth Embodiment

[Overview]

Image forming apparatus 100A according to the first embodiment has displayed the menu immediately after image forming apparatus 100A according to the first embodiment has accepted the unnecessary operation. In contrast, an image forming apparatus 100D according to a fourth embodiment displays the menu based on the fact that the button for closing the displayed image is pressed for a certain time period.

Figure 12:
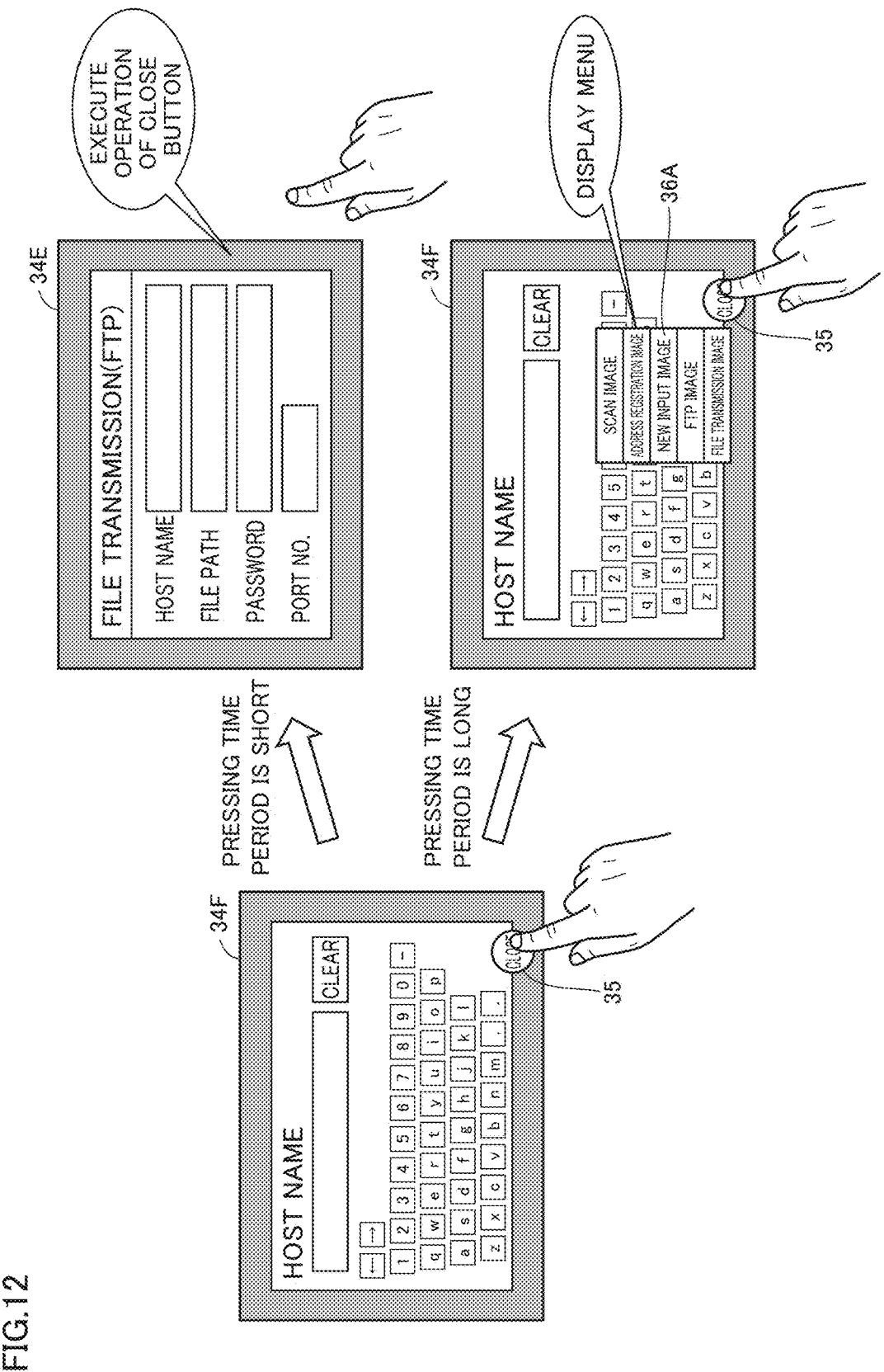
FIG. 12 is a diagram showing a specific example of image transition of an image forming apparatus according to a fourth embodiment.

An overview of image forming apparatus 100D according to the fourth embodiment will be described below with reference to FIG. 12. FIG. 12 is a diagram showing a specific example of image transition of image forming apparatus 100D. Since the remaining points such as a hardware configuration of image forming apparatus 100D are the same as those of image forming apparatus 100A according to the first embodiment, description thereof will not be repeated.

As shown in FIG. 12, image forming apparatus 100D displays button 35 for accepting the operation for making transition from the displayed image to another image, and detects a time period during which button 35 is pressed (hereinafter also referred to as "pressing time period"). When the pressing time period is shorter than a prescribed time period (e.g., two seconds), image forming apparatus 100D executes the operation when button 35 is pressed (e.g., the operation for closing the current image). In an example shown in FIG. 12, by executing the operation when button 35 is pressed, image 34E located in a higher hierarchy by one than image 34F is displayed. When the pressing time period is equal to or longer than the prescribed time period (e.g., two seconds), image forming apparatus 100D displays a menu 36A.

[Functional Configuration]

Figure 13:
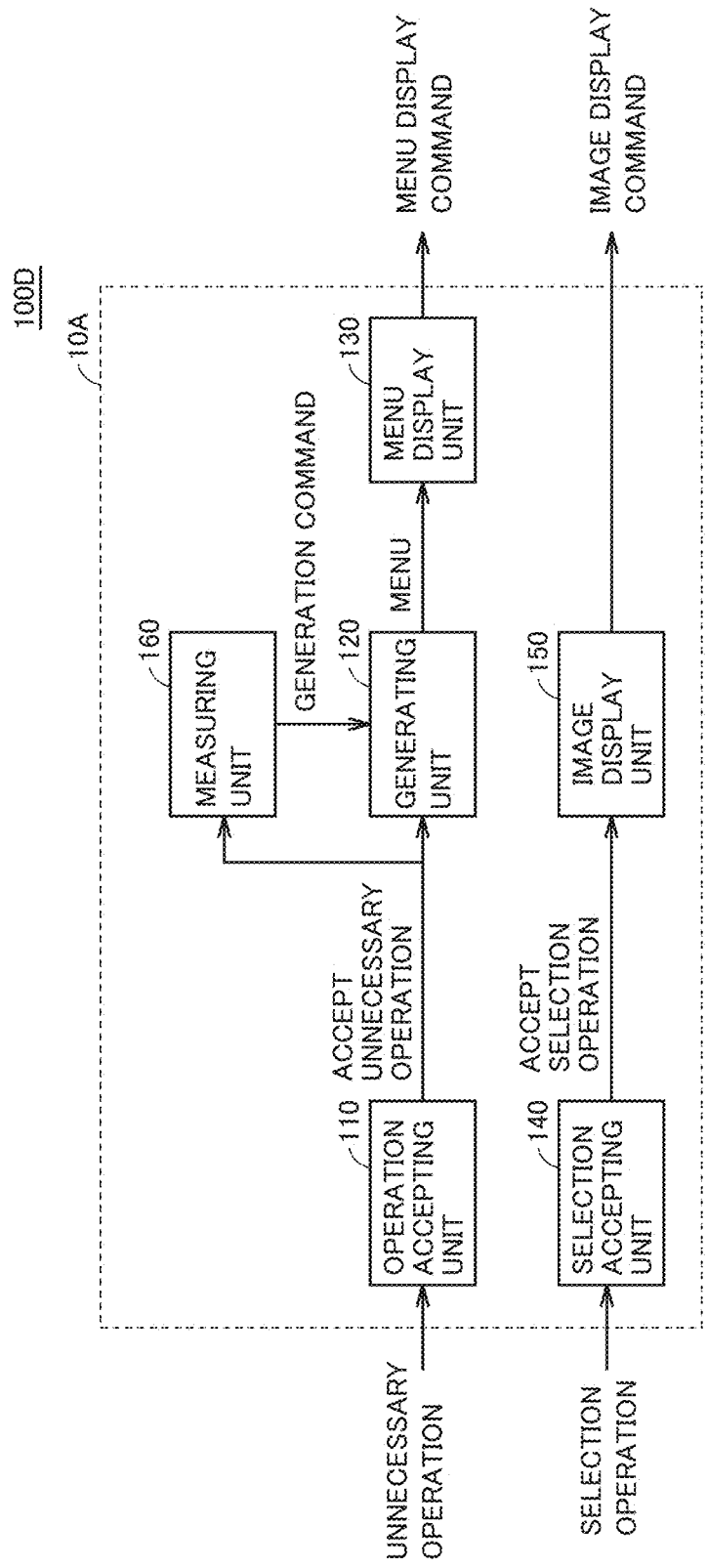
FIG. 13 is a block diagram showing one example of a functional configuration of the image forming apparatus according to the fourth embodiment.

A function of image forming apparatus 100D will be described with reference to FIG. 13. FIG. 13 is a block diagram showing one example of a functional configuration of image forming apparatus 100D. As shown in FIG. 13, CPU 10A of image forming apparatus 100D includes operation accepting unit 110, generating unit 120, menu display unit 130, selection accepting unit 140, image display unit 150, and a measuring unit 160. Since the functional configuration other than measuring unit 160 is the same as the functional configuration shown in FIG. 6, description will not be repeated.

Measuring unit 160 measures the time period during which the button (e.g., button 35 in FIG. 12) for accepting the operation for making transition from the displayed image to another image is pressed (i.e., the pressing time period). The pressing time period is measured by, for example, invoking a program (function) for measuring the time period, which is preliminarily incorporated into image forming apparatus 100D. Typically, based on detection of pressing of button 35, measuring unit 160 invokes this program and starts to measure the pressing time period. Measuring unit 160 monitors the pressing time period, and when the pressing time period becomes equal to or longer than the prescribed time period, measuring unit 160 outputs a command for generating the menu to generating unit 120. When receiving this command, generating unit 120 generates the menu. Thereafter, menu display unit 130 displays the menu generated by generating unit 120. While the pressing time period is shorter than the prescribed time period, measuring unit 160 does not output the command for generating menu 36A to generating unit 120. As a result, while the pressing time period is shorter than the prescribed time period, menu display unit 130 does not display the menu.

[Control Structure]

Figure 14:
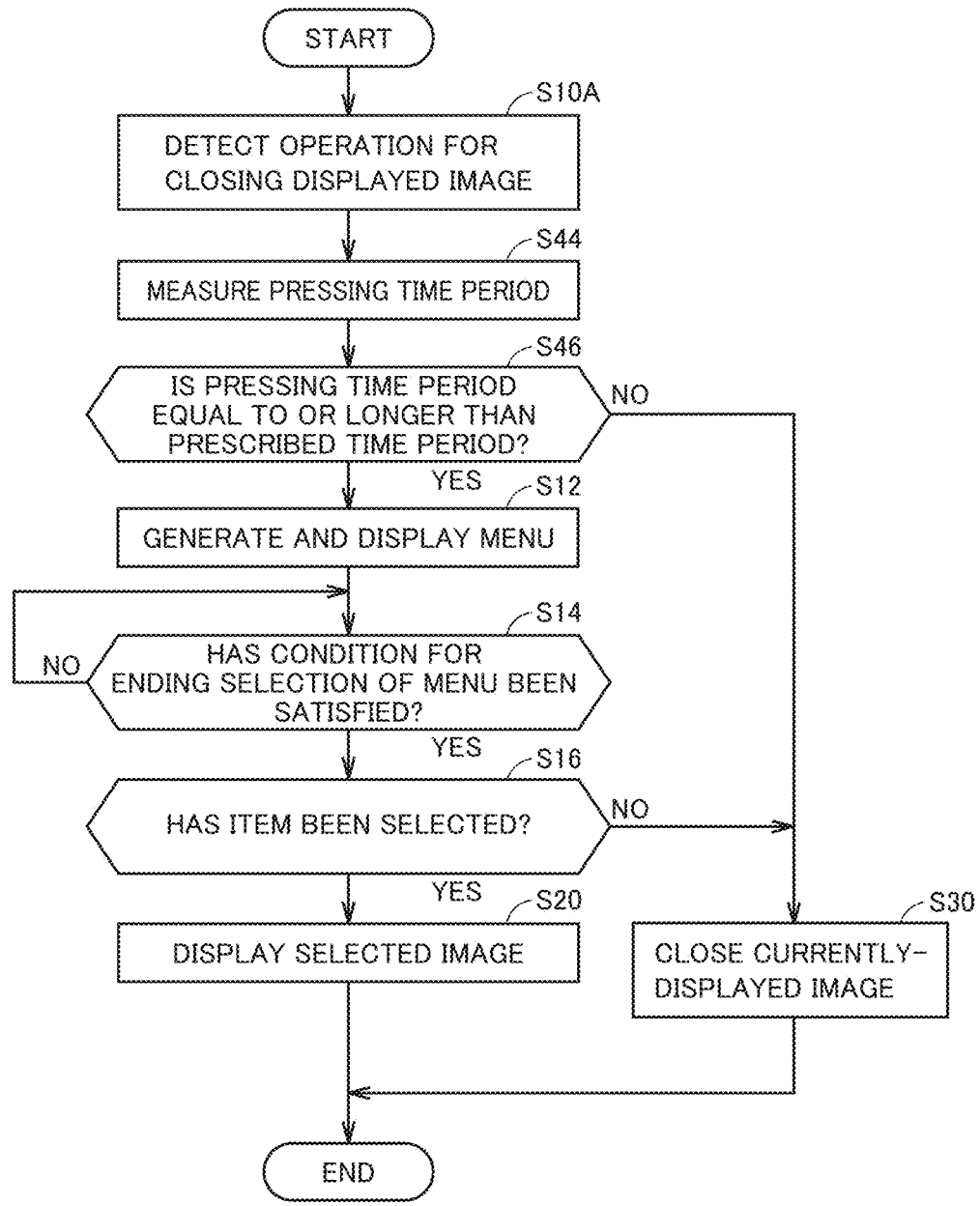
FIG. 14 is a flowchart showing a part of a process executed by the image forming apparatus according to the fourth embodiment.

A control structure of image forming apparatus 100D will be described with reference to FIG. 14. FIG. 14 is a flowchart showing a part of a process executed by image forming apparatus 100D. The process in FIG. 14 is implemented by CPU 10A (see FIG. 5) of image forming apparatus 100D executing a program. In another aspect, a part or all of the process may be executed by a circuit element or the other hardware. Since the process in the steps other than steps S44 and S46 shown in FIG. 14 is the same as the processes shown in FIGS. 7 and 9, description will not be repeated.

In step S44, CPU 10A as measuring unit 160 (see FIG. 13) measures the time period during which the button for closing the displayed image is pressed by the user. In step S46, CPU 10A as measuring unit 160 monitors the pressing time period and determines whether or not the pressing time period is equal to or longer than the prescribed time period. If CPU 10A determines that the pressing time period is equal to or longer than the prescribed time period (YES in step S46), CPU 10A switches control to step S12. If not (NO in step S46), CPU 10A switches control to step S30.

[Summary]

As described above, image forming apparatus 100D according to the present embodiment displays the menu based on the fact that the pressing time period has reached the prescribed time period. As a result, the menu is not displayed when the pressing time period is shorter than the prescribed time period, and thus, image forming apparatus 100D can prevent the wrong operation at the time of selection of the menu.

Fifth Embodiment

[Display Position of Menu]

In image forming apparatus 100A according to the first embodiment, a display position of the menu has not been particularly limited. Namely, in the first embodiment, the menu could be displayed in any place as long as the place is within the display area on operation panel 17 (see FIG. 5). In contrast, an image forming apparatus 100E according to a fifth embodiment displays the menu near a position where the operation indicating that the displayed image is unnecessary (i.e., the unnecessary operation) was accepted (hereinafter also referred to as "operation position").

Figure 15A:
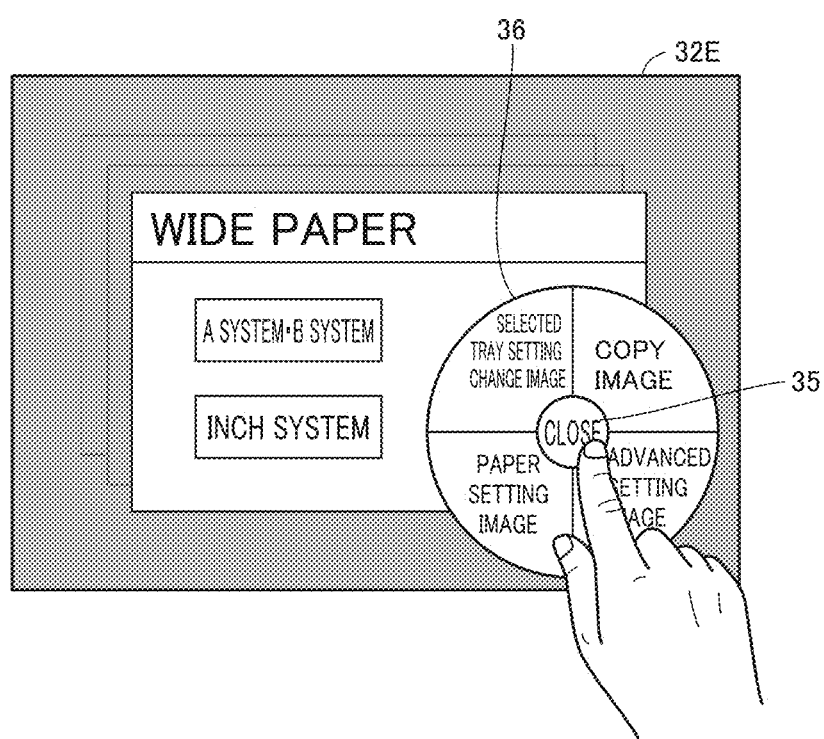
FIGS. 15A and 15B are diagrams showing examples of a display position of a menu.
Figure 15B:
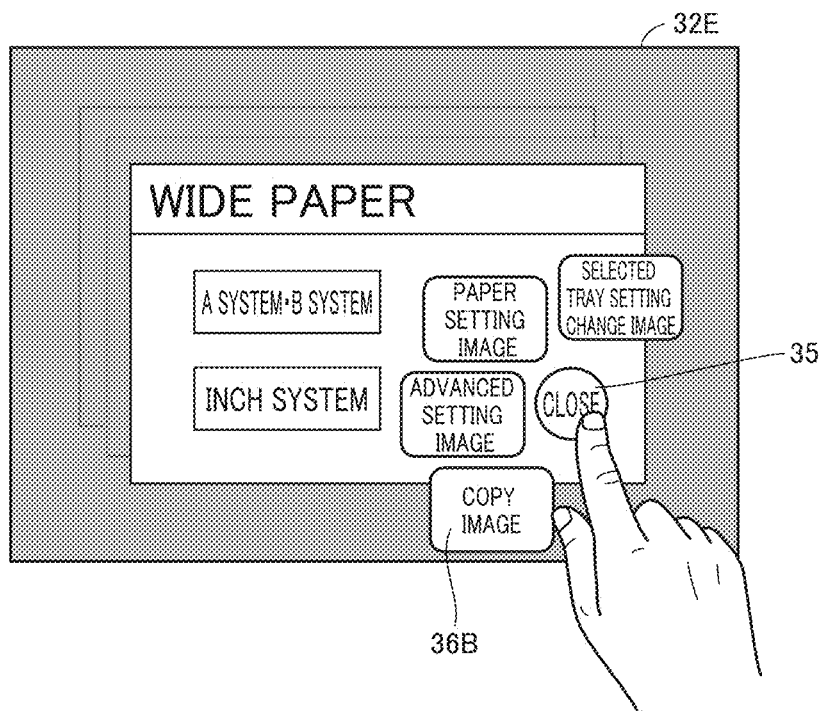

The display position of the menu will be described below with reference to FIGS. 15A and 15B. FIGS. 15A and 15B are diagrams showing examples of the display position of the menu. Since the remaining points such as a hardware configuration of image forming apparatus 100E are the same as those of image forming apparatus 100A according to the first embodiment, description thereof will not be repeated.

As shown in FIG. 15A, menu display unit 130 (see FIG. 6) of image forming apparatus 100E displays menu 36 near the operation position (e.g., a touch position) where the unnecessary operation was accepted. "Near" in the present embodiment refers to an area within a prescribed range from the operation position and an area within the display area on operation panel 17. In FIG. 15A, menu 36 is displayed near button 35 which is one example of the operation unit that accepts the unnecessary operation. As described above, menu 36 is displayed near the operation position, and thus, a movement distance of the finger from the operation position at the time of selection of the menu becomes shorter. As a result, the user can select the menu more easily and the operability at the time of selection of the menu is improved.

When the button for accepting the unnecessary operation is configured not by the image such as button 35 displayed on operation panel 17 but as the hardware such as a key, menu display unit 130 displays menu 36 in an area closest to this hardware within the display area on operation panel 17.

[Display Manner of Menu]

The display manner of the menu will be described with reference again to FIGS. 15A and 15B. Menu display unit 130 displays, radially about the operation position, the candidates to which transition from the displayed image can be made. At this time, menu display unit 130 preferably displays the candidates shown in the menu, such that the candidates are at an equal distance from the operation position. The respective items in the menu are displayed at the equal distance from the operation position, and thereby, the movement distances of the finger when the user selects the respective items become equal to one another. As a result, the user can constantly select the respective items in the menu with the same feeling, and thus, the operability at the time of selection of the menu is enhanced.

In addition, menu display unit 130 may display each item in the menu in various shapes. For example, as shown in FIG. 15A, menu display unit 130 displays menu 36 as a pie menu. Namely, each item shown in menu 36 is displayed in a sector shape. Alternatively, as shown in FIG. 15B, each item shown in a menu 36B may be displayed in a square shape with a rounded corner. Alternatively, each item shown in menu 36B may be displayed in a rectangular shape, a circular shape, or any other shape.

The hierarchy number of the image represented by each item may be displayed in each item shown in the menu. As a result, the user can grasp, at a glance, the hierarchy number of the image shown in each item in the menu, and thus, the operability at the time of selection of the menu is further enhanced.

[Summary]

As described above, image forming apparatus 100E according to the present embodiment displays the menu near the operation position. As a result, the movement distance of the finger from the operation position at the time of selection of the menu becomes shorter, and thus, the selection operation in the menu becomes easier.

Sixth Embodiment

[Display Order of Items in Menu]

In image forming apparatus 100A according to the first embodiment, a display order of the candidates in the menu has not been particularly limited. In contrast, an image forming apparatus 100F according to a sixth embodiment determines the display order of the candidates in the menu in accordance with the hierarchy of the image represented by the item displayed in the menu.

Figure 16B:
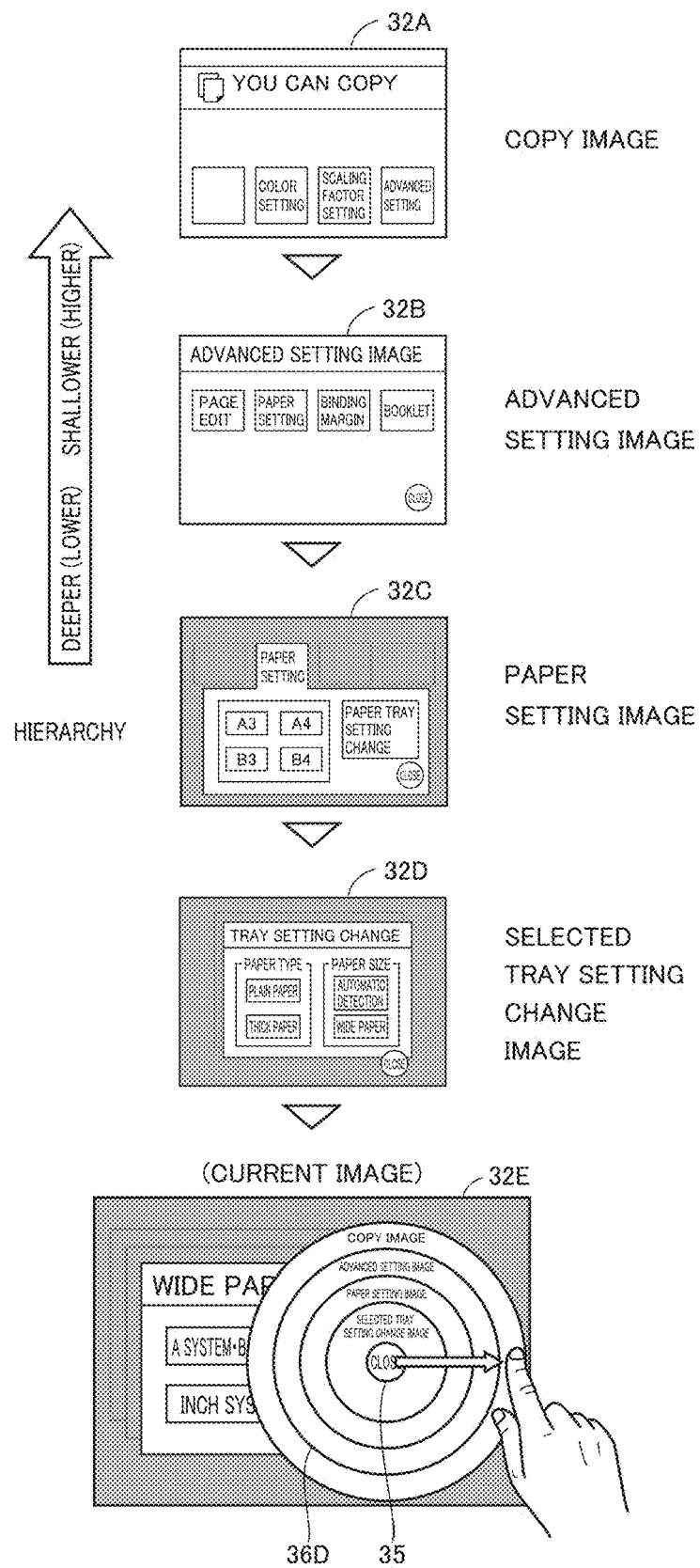

The display order of the candidates shown in the menu will be described below with reference to FIGS. 16A and 16B. FIGS. 16A and 16B are diagrams showing specific examples of the display manner of the menu when the candidates shown in the menu are displayed in the order of image hierarchy. Since the remaining points such as a hardware configuration of image forming apparatus 100F are the same as those of image forming apparatus 100A according to the first embodiment, description thereof will not be repeated.

Menu display unit 130 (see FIG. 6) of image forming apparatus 100F displays the image candidates such that an image candidate located in a higher hierarchy, of the image candidates shown in the menu, is more distant from the position where the unnecessary operation was detected (i.e., the operation position). Namely, menu display unit 130 displays the image candidates such that an image candidate located in a lower hierarchy, of the image candidates shown in the menu, is closer to the operation position.

For example, as shown in FIG. 16A, when the user presses button 35 for closing image 32E in the case where image 32E is displayed as the current image, menu display unit 130 displays, in menu 36, images 32A to 32D located in a higher hierarchy than that of image 32E. At this time, menu display unit 130 displays the items representing images 32A to 32D, such that the item representing image 32D located in the lowermost layer, of images 32A to 32D, is closest to button 35, and such that the item representing image 32A located in the highest level, of images 32A to 32D, is the most distant from button 35.

The shape of each item in the menu is arbitrary. For example, each item may be arranged linearly like a menu 36C shown in FIG. 16A, or each item may be arranged concentrically like a menu 36D shown in FIG. 16B.

[Control Structure]

Figure 17:
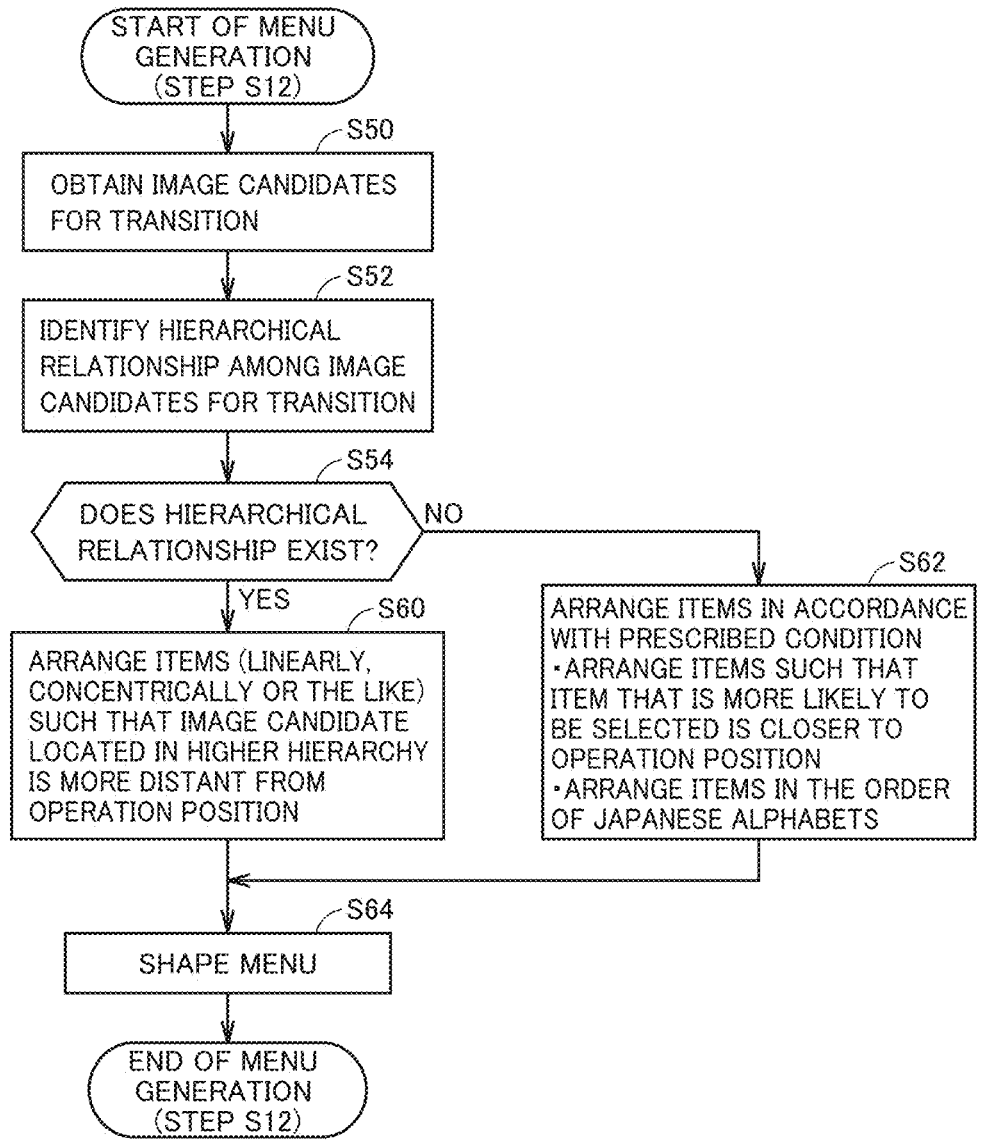
FIG. 17 is a flowchart showing a part of a process executed by an image forming apparatus according to a sixth embodiment.

A control structure of image forming apparatus 100F will be described with reference to FIG. 17. FIG. 17 is a flowchart showing a part of a process executed by image forming apparatus 100F. More specifically, the process in FIG. 17 is a flowchart showing, in detail, the menu generation process shown in step S12 in FIG. 7. The process in FIG. 17 is implemented by CPU 10A (see FIG. 5) of image forming apparatus 100F executing a program. In another aspect, a part or all of the process may be executed by a circuit element or the other hardware.

In step S50, CPU 10A obtains the image candidates to which transition from the displayed image can be made. In step S52, CPU 10A identifies the hierarchical relationship among the obtained image candidates. In step S54, CPU 10A determines whether or not the obtained image candidates have the hierarchical relationship. For example, when the obtained image candidates have a series of hierarchical relationship, CPU 10A determines that the obtained image candidates have the hierarchical relationship. If CPU 10A determines that the obtained image candidates have the hierarchical relationship (YES in step S54), CPU 10A switches control to step S60. If not (NO in step S54), CPU 10A switches control to step S62.

In step S60, CPU 10A arranges the image candidates such that an image candidate located in a higher hierarchy is more distant from the operation position. At this time, CPU 10A arranges each item representing each candidate linearly or concentrically, for example. In step S62, in accordance with a predetermined condition, CPU 10A arranges the items representing the image candidates to which transition can be made. The predetermined condition includes, for example, arranging the selection items in the menu in the order of Japanese alphabets. Alternatively, the predetermined condition includes arranging the candidates such that a candidate that is more likely to be selected is closer to the operation position. As one example, the possibility of the item being selected is calculated based on how many times the item was selected in the past. In step S64, CPU 10A shapes the menu.

[Summary]

As described above, image forming apparatus 100F according to the present embodiment displays the image candidates such that an image candidate located in a higher hierarchy is more distant from the operation position. As a result, the hierarchy number of the transition destination image corresponds to the movement distance of the finger at the time of the selection operation in the menu, and thus, the user can intuitively perform the selection operation in the menu.

Seventh Embodiment

[Selection Operation in Menu]

In image forming apparatus 100A according to the first embodiment, the selection operation could be implemented by any method as long as a particular image could be selected from the image candidates shown in the menu. In contrast, in an image forming apparatus 100G according to a seventh embodiment, the selection operation in the menu is specifically described.

The selection operation in the menu will be described below with reference to FIGS. 18A-18D. FIGS. 18A-18D are diagrams showing specific examples of the selection operation in the menu. Since the remaining points such as a hardware configuration of image forming apparatus 100G are the same as those of image forming apparatus 100A according to the first embodiment, description thereof will not be repeated.

Figure 18B:
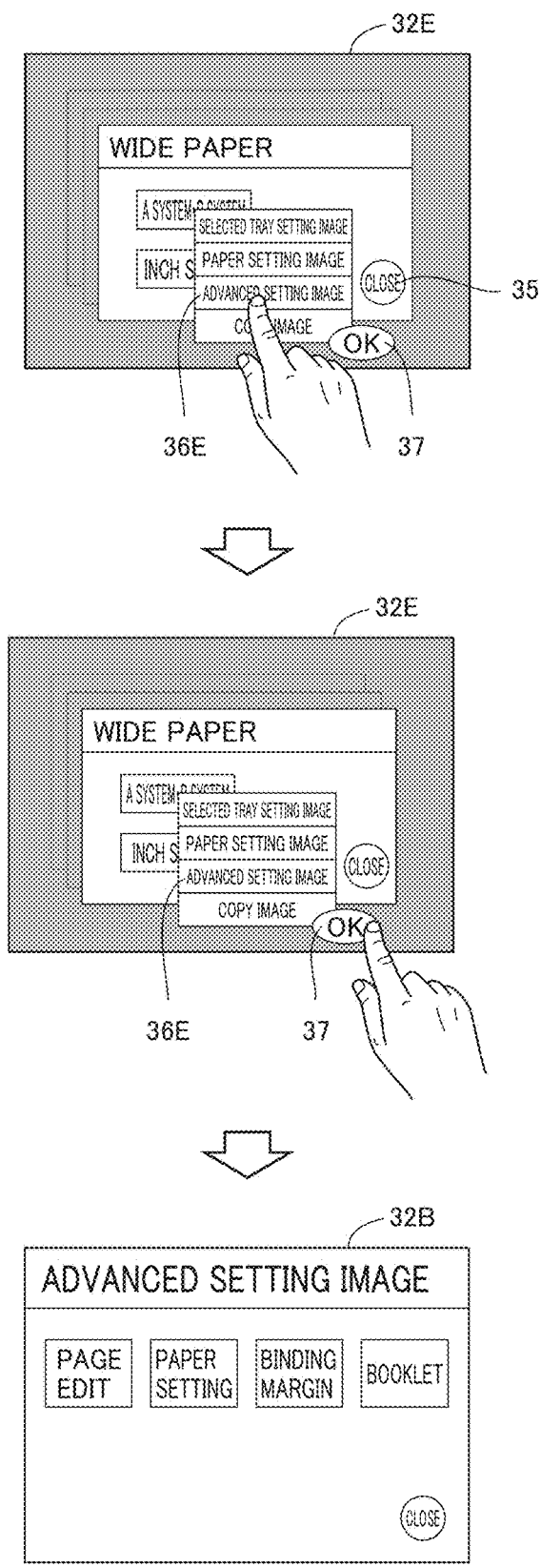

The selection operation in the menu is implemented by at least one of the drag operation and the tap operation. For example, as shown in FIGS. 18A and 18B, the selection operation in the menu is implemented by the tap operation. In FIG. 18A, when the user taps button 35 for closing the displayed image, image forming apparatus 100G displays menu 36 around button 35. Thereafter, the user taps a particular item, of the items shown in menu 36, and opens intended image 32B. At the same time, image forming apparatus 100G erases display of menu 36.

In FIG. 18B, when the user taps button 35 for closing the displayed image, image forming apparatus 100G displays a menu 36E near button 35. Thereafter, the user taps a particular item, of the items shown in menu 36E, and provisionally selects the item shown in menu 36E. Thereafter, the user taps an OK button 37, and fixes the selection of the provisionally selected item. In this manner, the user opens intended image 32B. At the same time, image forming apparatus 100G erases display of menu 36E.

Figure 18D:
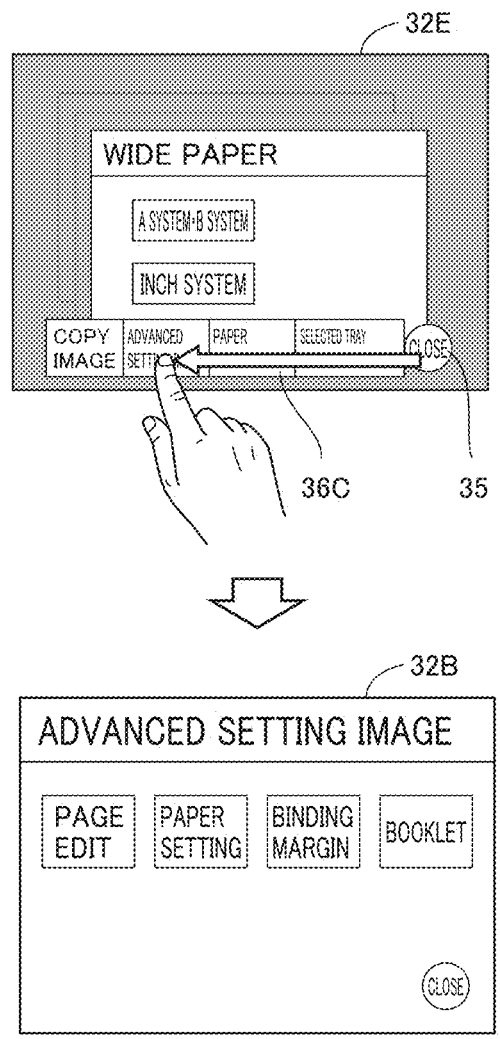

As shown in FIGS. 18C and 18D, the selection operation in the menu may also be implemented by the drag operation. In FIG. 18C, when the user presses button 35 for closing the displayed image, image forming apparatus 100G displays menu 36 around button 35. Thereafter, with button 35 being pressed, the user drags (slides) his/her finger toward the direction of the intended item and releases his/her finger from button 35 by a prescribed distance or longer, thereby performing the selection operation in the menu. Image forming apparatus 100G displays image 32B represented by the item shown in the sliding direction of his/her finger from button 35. At the same time, image forming apparatus 100G erases display of menu 36.

In FIG. 18D, when the user presses button 35 for closing the displayed image, image forming apparatus 100G displays menu 36C linearly by using button 35 as a starting point. Thereafter, with button 35 being pressed, the user drags (slides) his/her finger to the intended item and releases his/her finger on the intended item, thereby performing the selection operation in the menu. Image forming apparatus 100G displays image 32B represented by the item displayed at the position where his/her finger was released. At the same time, image forming apparatus 100G erases display of menu 36C.

The selection operation may be implemented not by the drag operation and the tap operation but by the other operation. For example, the selection operation may be implemented by the flick operation, the selection operation by hardware such as a cross key, and any other operation that allows selection of a particular item from the items in the menu.

[Summary]

As described above, image forming apparatus 100G according to the present embodiment implements the selection operation by at least one of the drag operation and the tap operation. Since the selection operation is implemented by the easy operation such as the drag operation and the tap operation, the operability at the time of selection of the menu can be enhanced in image forming apparatus 100G.

Eighth Embodiment

[Thumbnail of Item Shown in Menu]

Image forming apparatus 100A according to the first embodiment has displayed each image candidate to which transition from the displayed image can be made, on the menu in characters. In contrast, an image forming apparatus 100H according to an eighth embodiment further displays a thumbnail of the image candidate to which transition from the displayed image can be made.

Figure 19A:
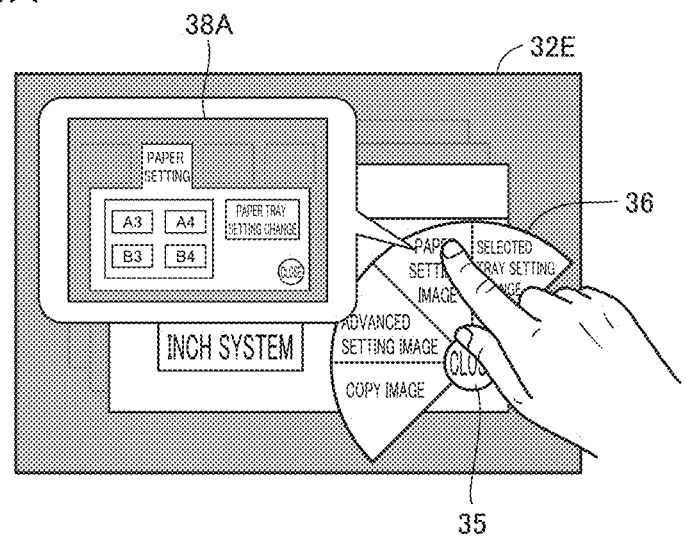
FIGS. 19A and 19B are diagrams showing specific examples of a display manner of a thumbnail.
Figure 19B:
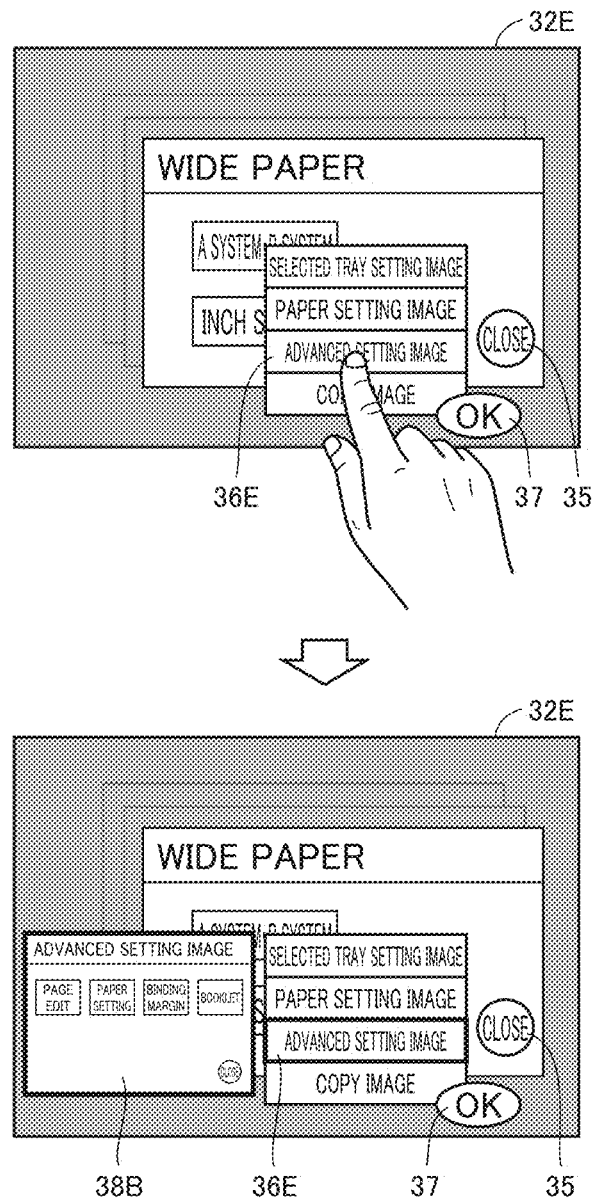

A method for displaying this thumbnail will be described below with reference to FIGS. 19A and 19B. FIGS. 19A and 19B are diagrams showing specific examples of a display manner of the thumbnail. Since the remaining points such as a hardware configuration of image forming apparatus 100H are the same as those of image forming apparatus 100A according to the first embodiment, description thereof will not be repeated.

In the present embodiment, operation accepting unit 110 (see FIG. 6) of image forming apparatus 100H is configured to accept the two-level operation for accepting an operation for provisionally selecting a particular image from the image candidates shown in the menu, and thereafter, determining the provisionally selected image as a displayed image. While the image candidate shown in the menu is provisionally selected, menu display unit 130 (see FIG. 6) of image forming apparatus 100H displays a thumbnail of the image on operation panel 17 (see FIG. 5). As described above, the thumbnail of the image shown in the menu is displayed, and thus, the user can check the contents of the image shown in each item. As a result, image forming apparatus 100H can prevent the wrong operation at the time of selection of the menu.

A more specific display example of the thumbnail will be described. In FIG. 19A, when the user presses button 35 for closing the displayed image, image forming apparatus 100H displays menu 36 around button 35. Thereafter, when the user drags (slides) his/her finger onto the intended item, with button 35 being pressed, this item enters a state of being provisionally selected (hereinafter also referred to as "provisionally selected state"). When the item enters the provisionally selected state, image forming apparatus 100H displays a thumbnail 38A of the image shown in the item in the provisionally selected state. Namely, while the user's finger is located on the item in the menu, image forming apparatus 100H displays thumbnail 38A of the image shown in this item. When the user releases his/her finger on the item in the provisionally selected state, image forming apparatus 100H fixes the selection of the item in the provisionally selected state, and displays the image shown in this item.

In FIG. 19B, when the user taps button 35 for closing the displayed image, image forming apparatus 100H displays menu 36E near button 35. Thereafter, when the user taps a particular item from the items shown in menu 36E, this item enters the provisionally selected state. When the item enters the provisionally selected state, image forming apparatus 100H displays a thumbnail 38B of the image shown in the item in the provisionally selected state. When the user taps OK button 37 while the item is in the provisionally selected state, image forming apparatus 100H fixes the selection of the item in the provisionally selected state, and displays the image shown in this item. As described above, during a time period from when the selected item in menu 36E is provisionally selected to when OK button 37 is pressed, image forming apparatus 100H displays thumbnail 38B corresponding to the provisionally selected item.

[Control Structure]

Figure 20:
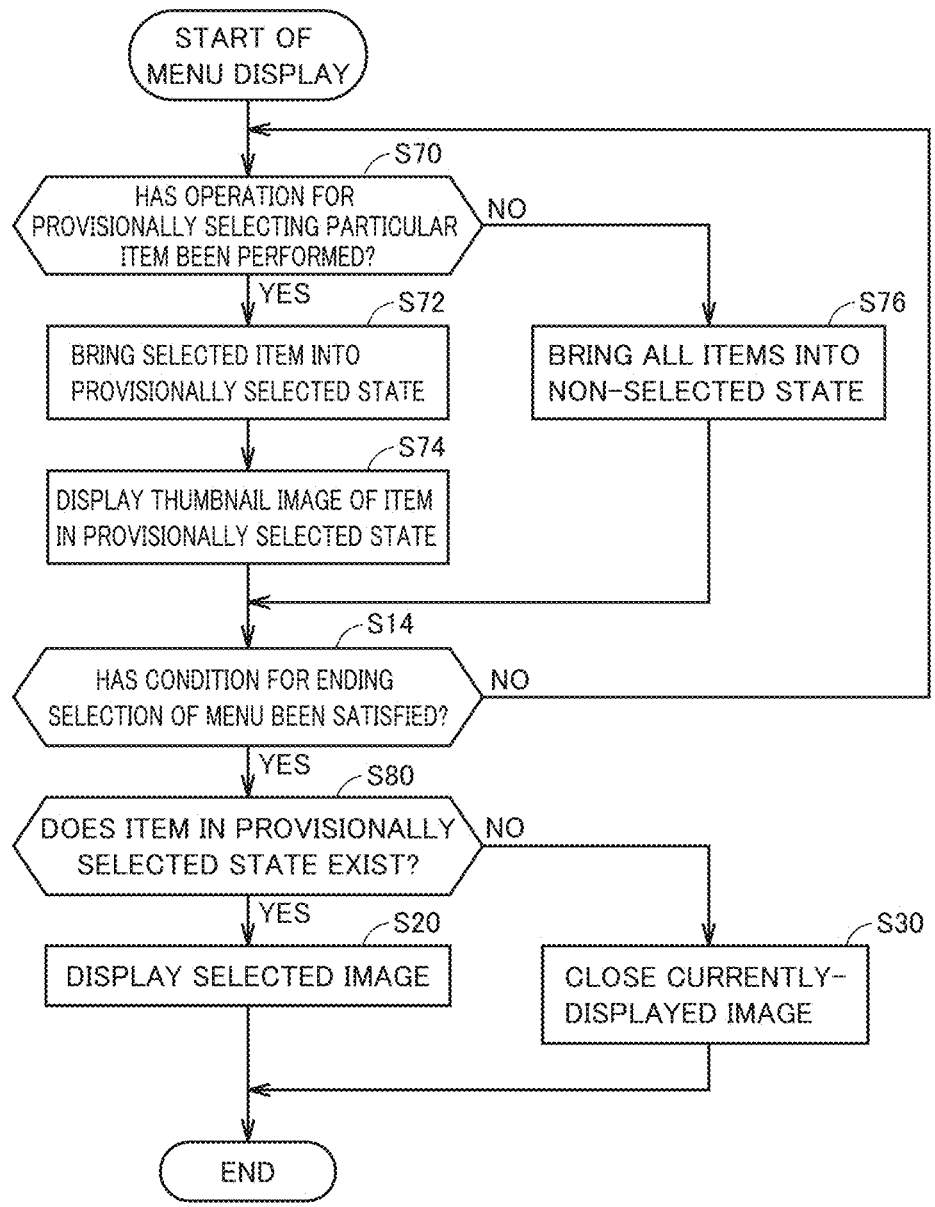
FIG. 20 is a flowchart showing a part of a process executed by an image forming apparatus according to an eighth embodiment.

A control structure of image forming apparatus 100H will be described with reference to FIG. 20. FIG. 20 is a flowchart showing a part of a process executed by image forming apparatus 100H. The process in FIG. 20 is implemented by CPU 10A (see FIG. 5) of image forming apparatus 100H executing a program. In another aspect, a part or all of the process may be executed by a circuit element or the other hardware. Since the process in steps S14, S20 and S30 shown in FIG. 20 is the same as the process shown in FIG. 7, description will not be repeated.

In step S70, CPU 10A as operation accepting unit 110 (see FIG. 6) determines whether or not a particular item has been provisionally selected by the user from the items shown in the menu. If CPU 10A determines that the particular item has been provisionally selected by the user (YES in step S70), CPU 10A switches control to step S72. If not (NO in step S70), CPU 10A switches control to step S76.

In step S72, CPU 10A brings the item provisionally selected by the user into the provisionally selected state. In step S74, CPU 10A as menu display unit 130 (see FIG. 6) displays the thumbnail of the image shown in the item in the provisionally selected state. In step S76, CPU 10A brings all items shown in the menu into a non-selected state.

In step S80, CPU 10A determines whether or not the item in the provisionally selected state exists. If CPU 10A determines that the item in the provisionally selected state exists (YES in step S80), CPU 10A switches control to step S20. If not (NO in step S80), CPU 10A switches control to step S30.

[Summary]

As described above, while the item shown in the menu is provisionally selected, image forming apparatus 100H according to the present embodiment displays the thumbnail of the image shown in this item. As a result, the user can easily grasp the contents of the transition destination image.

Ninth Embodiment

[Overview]

Image forming apparatus 100B according to the second embodiment has included the images having the hierarchical relationship with the displayed image in the menu as the image candidates to which transition can be made. In contrast, an image forming apparatus 100I according to a ninth embodiment displays, in the menu, not only the images having the hierarchical relationship with the displayed image but also the images to which transition from the displayed image is highly likely to be made.

An overview of image forming apparatus 100I according to the ninth embodiment will be described below with reference to FIG. 21. FIG. 21 is a diagram showing a specific example of the display manner of the menu in image forming apparatus 100I according to the ninth embodiment. Since the remaining points such as a hardware configuration of image forming apparatus 100I are the same as those of image forming apparatus 100A according to the first embodiment, description thereof will not be repeated.

Images 32A, 32B and 32G shown in FIG. 21 are assumed to have a hierarchical relationship with one another. In an example shown in FIG. 21, the user is assumed to first open image 32A for performing setting at the time of printing. The user is assumed to next open image 32B and set a layout at the time of printing at "booklet". The user is assumed to then open image 32G in order to perform setting for shifting a printing position. However, image forming apparatus 100I is assumed to be configured not to accept the setting for shifting the printing position, when the layout at the time of printing is set at "booklet". Therefore, image forming apparatus 100I displays an error image 32H indicating that the setting of "booklet" cannot be combined with the setting for shifting the printing position. The user who saw this error image 32H is highly likely to open an image for canceling the setting of "booklet" in order to allow the user to perform the setting for shifting the printing position. As described above, the image that is highly likely to be opened next by the user can be estimated based on a current set value for image forming apparatus 100I and the contents of the image such as error image 32H.

Therefore, image forming apparatus 100I according to the present embodiment displays, as the menu, not only the images located in a higher hierarchy than that of the displayed image but also the images to which transition from the displayed image is highly likely to be made. In an example of a menu 36F shown in FIG. 21, not only the items ("copy image" and "advanced setting" in menu 36F) representing images 32A and 32B located in a higher hierarchy than that of currently-displayed image 32G, but also the item ("booklet setting" in menu 36F) representing the image for canceling the setting of "booklet" is shown.

[Data Structure of Image Table 50]

In order to identify an image to which transition from the displayed image is highly likely to be made, image forming apparatus 100I preliminarily holds image information that associates an image candidate to which transition is highly likely to be made with each image (hereinafter also referred to as "image table"). Based on the image table, image forming apparatus 100I identifies the image to which transition from the current image is highly likely to be made. An image table 50 will be described below with reference to FIG. 22. FIG. 22 is a diagram showing one example of a data structure of image table 50. Image table 50 is prestored in, for example, an internal storage device of image forming apparatus 100I such as ROM 11 (see FIG. 5). Alternatively, image table 50 may be stored in an external storage device and the like.

As shown in FIG. 22, image table 50 shows a correspondence relationship between the displayed image and the images to which transition is highly likely to be made next. In image table 50 shown in FIG. 22, "setting check image" and "copy image" are associated with "registration setting image". "Inter sheet setting image", "cover sheet setting image", "advanced setting image", and "copy image" are associated with "insert page setting image". "Water mark setting image", "advanced setting image" and "copy image" are associated with "stamp setting image".

Preferably, the images that allow settings similar to the settings that can be performed in the displayed image are associated with the displayed image defined in image table 50. When there are many images similar in settable contents, there is a possibility that the user opens an unintended image similar in settable contents. When the user opens such a wrong image, the user is highly likely to reopen an image similar in settable contents to the opened image. Therefore, the images similar in settable contents are associated with each other, and thus, the images to which transition is highly likely to be made are associated with each other.

For example, as shown in image table 50 in FIG. 22, "insert page setting image" and "inter sheet setting image" that allow setting about insertion of a page are associated with each other. In addition, "stamp setting image" and "water mark setting image" for performing an operation for inserting a text or an image onto a document are associated with each other.

Image table 50 shown in FIG. 22 shows the example in which only the image candidates to which transition is highly likely to be made are associated with each displayed image. However, the images located in a higher hierarchy than that of the displayed image may be further associated with each displayed image.

[Data Structure of Set Value Table 52]

There is a high possibility that the user who sets the setting item of "color setting" for image forming apparatus 100I at "gray scale" wants to save the printing cost. Therefore, when the setting item of "color setting" is set at the set value of "gray scale", "Nin1 setting image" or "image printing setting image" that allows reduction in printing cost is highly likely to be opened next. As described above, the image that is highly likely to be opened next by the user can be estimated based on the current set value for image forming apparatus 100I.

Image forming apparatus 100I preliminarily holds image information that associates an image candidate to which transition is highly likely to be made next with each set value set for the image (hereinafter also referred to as "set value table"). Based on the set value table, image forming apparatus 100I identifies the image to which transition is highly likely to be made next on the premise of the current set value. A set value table 52 will be described below with reference to FIG. 23. FIG. 23 is a diagram showing one example of a data structure of set value table 52. Set value table 52 is prestored in, for example, an internal storage device of image forming apparatus 100I such as ROM 11 (see FIG. 5). Alternatively, set value table 52 may be stored in an external storage device and the like.

Set value table 52 defines a correspondence relationship between the set value for image forming apparatus 100I and the images to which transition is highly likely to be made next. In set value table 52 shown in FIG. 23, "punch setting image" is associated with the set value of "ON" for the setting item of "binding margin setting". "Nin1 setting image" and "image printing setting image" are associated with the set value of "gray scale" for the setting item of "color setting". "Image shift setting image" is associated with the set value of "booklet ON" for the setting item of "booklet setting".

[Method for Determining which Image Candidate is Included in Menu]

Figure 24:
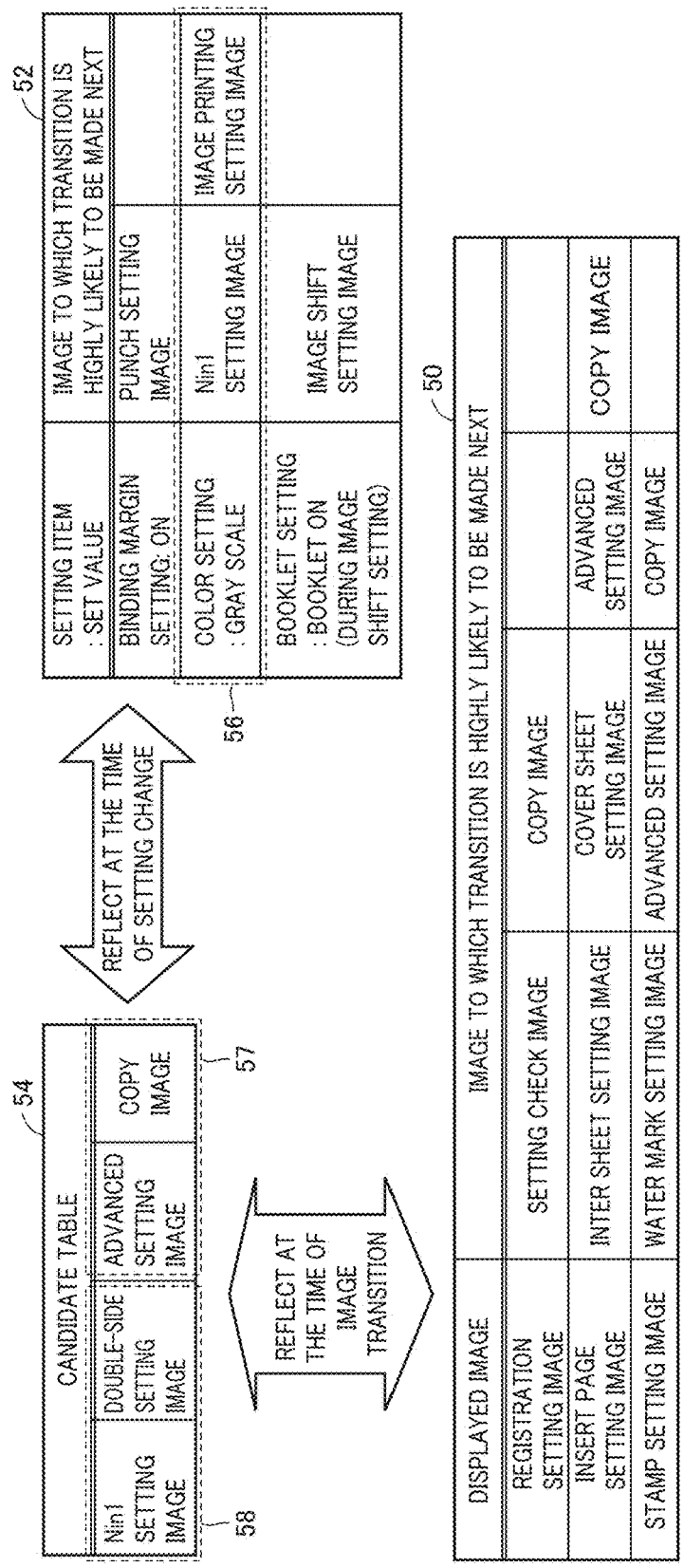
FIG. 24 is a conceptual diagram schematically showing a method for identifying which image candidate is included in the menu in the image forming apparatus according to the ninth embodiment.

Image forming apparatus 100I refers to image table 50 and set value table 52 described above, and determines which image candidate is included in the menu. A method for determining which image candidate is included in the menu will be described with reference to FIG. 24. FIG. 24 is a conceptual diagram schematically showing the method for determining which image candidate is included in the menu in image forming apparatus 100I.

Image forming apparatus 100I identifies the image associated with the displayed image based on image table 50, and identifies the image associated with the set value set in image forming apparatus 100I based on set value table 52. Image forming apparatus 100I includes the identified images in candidate table 54. As a result, the image candidates to which transition from the current image is made are written into candidate table 54. When accepting the unnecessary operation, image forming apparatus 100I refers to candidate table 54 and generates the menu showing the candidates defined in candidate table 54. Candidate table 54 is updated when transition from the displayed image takes place or when the set value is changed by the user. Candidate table 54 is prestored in, for example, an internal storage device of image forming apparatus 100I such as ROM 11 (see FIG. 5). Alternatively, candidate table 54 may be stored in an external storage device and the like.

A specific example of the method for determining which image candidate is included in the menu will be described. As shown in FIG. 24, when transition from the displayed image takes place, image forming apparatus 100I identifies the image to which transition from the current image is highly likely to be made, based on image table 50 described above. For example, when the current image is "paper setting image", image forming apparatus 100I refers to image table 50 and identifies the image associated with "paper setting image". Since no image is associated with "paper setting image" in image table 50 shown in FIG. 24, image forming apparatus 100I does not update candidate table 54.

When the set value is changed by the user, image forming apparatus 100I identifies the image to which transition from the current image is highly likely to be made, based on set value table 52. For example, when the current set value for the current setting item of "color setting" is "gray scale", image forming apparatus 100I refers to set value table 52 and identifies the images associated with the set value of "gray scale". In set value table 52 shown in FIG. 24, "Nin1 setting image" and "image printing setting image" are associated with the set value of "gray scale" (see a dotted line 56). Image forming apparatus 100I includes "Nin1 setting image" and "image printing setting image" in candidate table 54 (see a dotted line 58).

Image forming apparatus 100I may further include an image located in a higher hierarchy than that of the current image in candidate table 54. In an example shown in FIG. 24, "advanced setting image" (see image 32B in FIGS. 16A and 16B) and "copy image" (see image 32A in FIGS. 16A and 16B) located in a higher hierarchy than that of the current image of "paper setting image" (see image 32C in FIGS. 16A and 16B) are included in candidate table 54 (see a dotted line 57).

[Functional Configuration]

Figure 25:
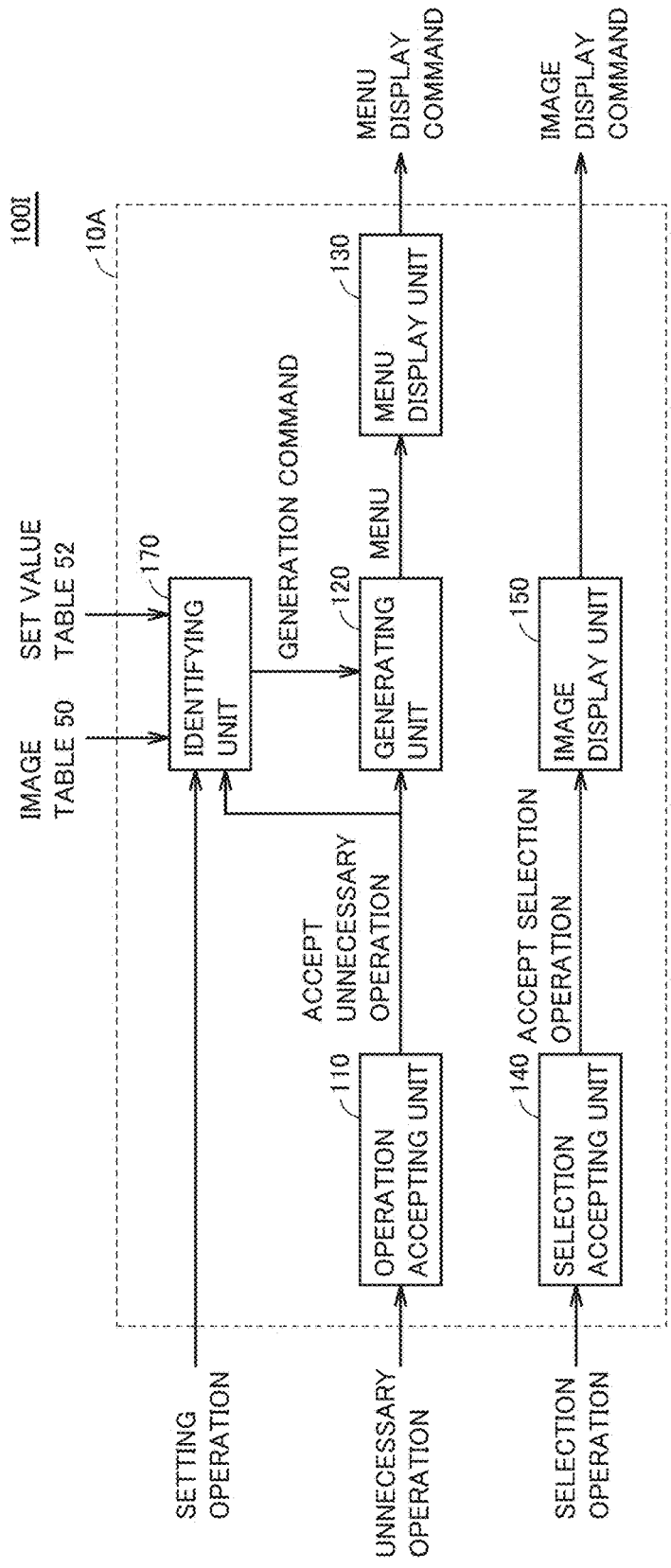
FIG. 25 is a block diagram showing one example of a functional configuration of the image forming apparatus according to the ninth embodiment.

A function of image forming apparatus 100I will be described with reference to FIG. 25. FIG. 25 is a block diagram showing one example of a functional configuration of image forming apparatus 100I. As shown in FIG. 25, CPU 10A of image forming apparatus 100I includes operation accepting unit 110, generating unit 120, menu display unit 130, selection accepting unit 140, image display unit 150, and an identifying unit 170. Since the functional configuration other than identifying unit 170 is the same as the functional configuration shown in FIG. 6, description will not be repeated.

Identifying unit 170 identifies the image associated with the displayed image, based on image table 50 (see FIG. 24). Preferably, the image identified based on image table 50 is identified at a timing of image transition. Identifying unit 170 also identifies the image associated with the set value set in image forming apparatus 100I, based on set value table 52 (see FIG. 24). Preferably, the image identified based on set value table 52 is identified at a timing when the set value for image forming apparatus 100I is changed by the user.

Generating unit 120 generates the menu by using, as the candidates, the image located in a higher hierarchy than that of the current image, the image identified by identifying unit 170 based on image table 50, and the image identified by identifying unit 170 based on set value table 52.

[Control Structure]

Figure 26:
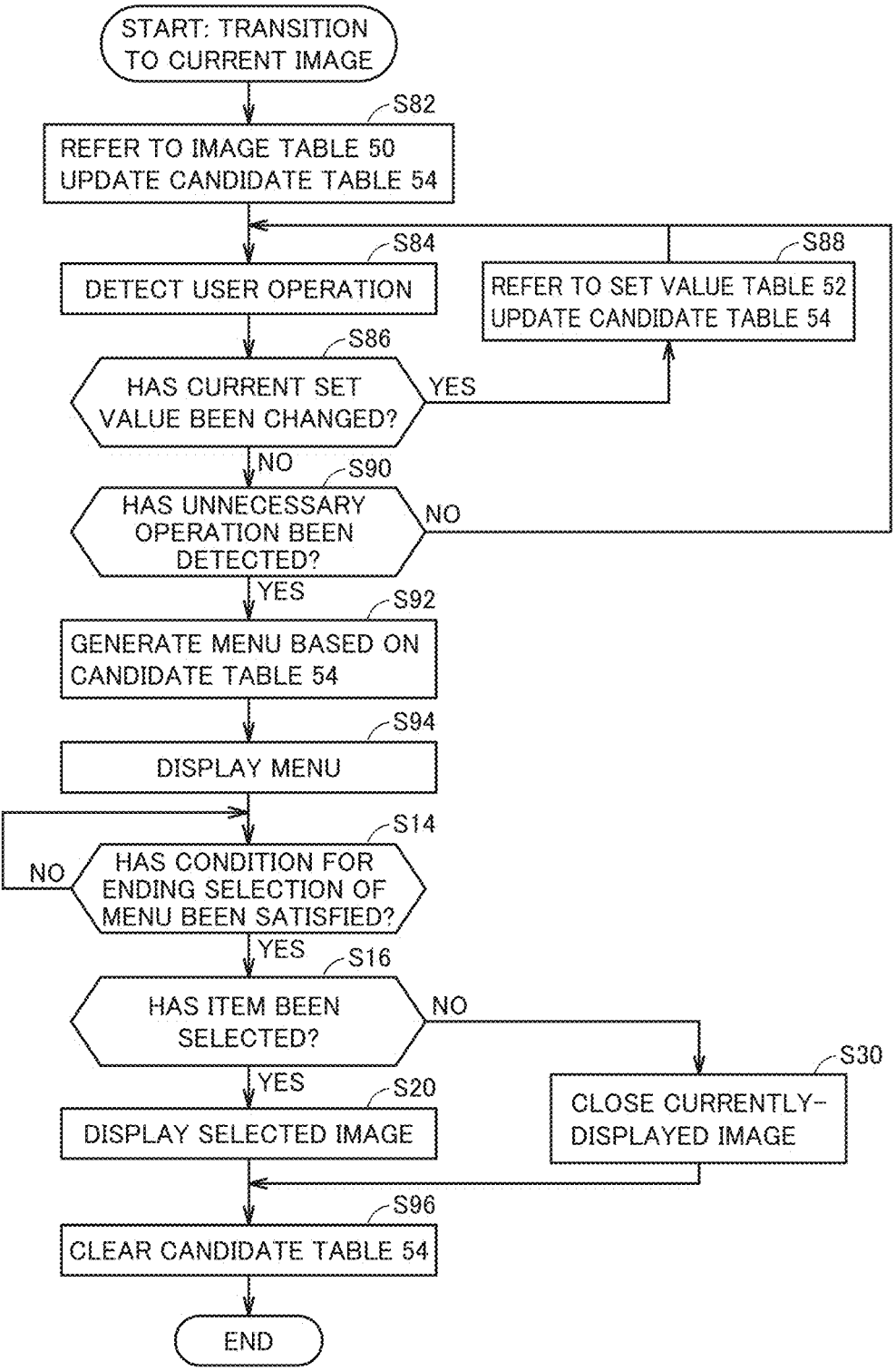
FIG. 26 is a flowchart showing a part of a process executed by the image forming apparatus according to the ninth embodiment.

A control structure of image forming apparatus 100I will be described with reference to FIG. 26. FIG. 26 is a flowchart showing a part of a process executed by image forming apparatus 100I. The process in FIG. 26 is implemented by CPU 10A (see FIG. 5) of image forming apparatus 100I executing a program. In another aspect, a part or all of the process may be executed by a circuit element or the other hardware. Since the process in steps S14, S16, S20, and S30 shown in FIG. 26 is the same as the process shown in FIG. 7, description will not be repeated.

In step S82, CPU 10A as identifying unit 170 (see FIG. 25) identifies the image to which transition from the displayed image is highly likely to be made, based on image table 50 (see FIG. 24), and adds the identified image to candidate table 54 (see FIG. 24). In step S84, CPU 10A detects the user operation performed on image forming apparatus 100I.

In step S86, CPU 10A determines whether or not the user operation detected in step S84 is for changing the current set value for image forming apparatus 100I. If CPU 10A determines that the current set value for image forming apparatus 100I has been changed (YES in step S86), CPU 10A switches control to step S88. If not (NO in step S86), CPU 10A switches control to step S90.

In step S88, CPU 10A as identifying unit 170 identifies the image associated with the set value currently set for image forming apparatus 100I, based on set value table 52 (see FIG. 24), and adds the identified image to candidate table 54.

In step S90, CPU 10A determines whether or not the unnecessary operation has been detected. If CPU 10A determines that the unnecessary operation has been detected (YES in step S90), CPU 10A switches control to step S92. If not (NO in step S90), CPU 10A executes the process in step S84 again. In step S92, CPU 10A as generating unit 120 (see FIG. 24) generates the menu showing the image candidates shown in candidate table 54. In step S94, CPU 10A as menu display unit 130 (see FIG. 24) displays the generated menu. In step S96, CPU 10A clears the image candidates shown in candidate table 54.

[Summary]

As described above, image forming apparatus 100I according to the present embodiment generates the menu including not only the image candidates located in a higher hierarchy than that of the displayed image but also the image candidates to which transition is highly likely to be made. This increases the possibility that the image intended by the user is included in the menu, and thus, the operability at the time of the unnecessary operation can be further enhanced.

Tenth Embodiment

[Overview]

Image forming apparatus 100A according to the first embodiment has uniformly displayed the items shown in the menu. In contrast, an image forming apparatus 100J according to a tenth embodiment displays the image candidates such that a candidate that is more likely to be selected by the user is easier to be visually recognized than the other image candidates.

Figure 27:
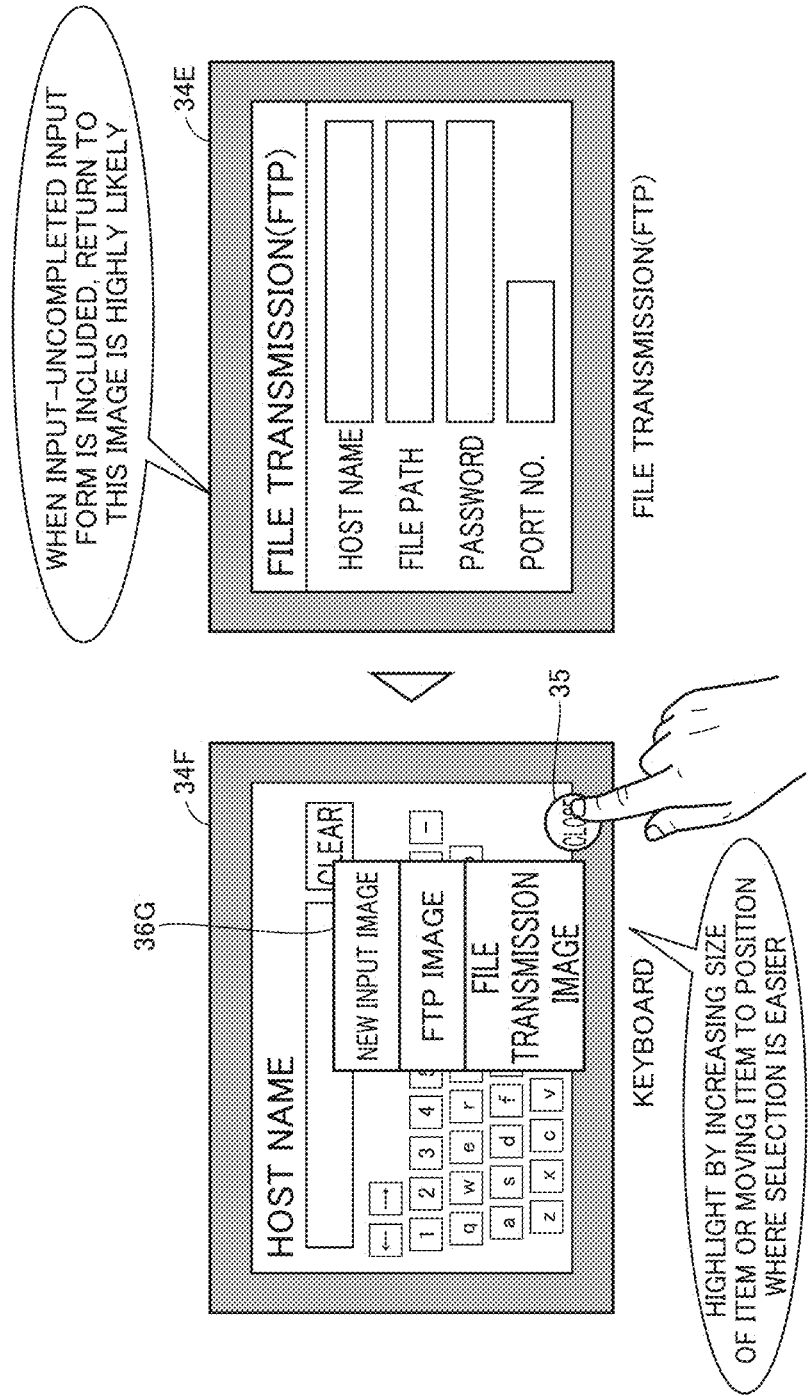
FIG. 27 is a diagram showing a specific example of the display manner of the menu in an image forming apparatus according to a tenth embodiment.

An overview of image forming apparatus 100J according to the tenth embodiment will be described below with reference to FIG. 27. FIG. 27 is a diagram showing a specific example of the display manner of the menu in image forming apparatus 100J according to the tenth embodiment. Since the remaining points such as a hardware configuration of image forming apparatus 100J are the same as those of image forming apparatus 100A according to the first embodiment, description thereof will not be repeated.

As shown in FIG. 27, the user is assumed to sequentially open images 34C to 34F in the process of performing an operation for transmitting scan data to the other device. In this process, the user is assumed to open image 34F before an input to image 34E is completed. At this time, the user is highly likely to open input-uncompleted image 34E next to image 34F. Like a menu 36G shown in FIG. 27, in order to allow the user to easily select image 34F, image forming apparatus 100J displays the items such that the item representing image 34E that is most likely to be selected is easier to be visually recognized than the items representing the other images 34C and 34D.

As described above, image forming apparatus 100J according to the present embodiment displays the image candidates such that the image candidate that is more likely to be selected by the user, of the image candidates shown in the menu, is easier to be visually recognized than the other image candidates. As a result, the operability at the time of selection of the menu is further enhanced in image forming apparatus 100J.

"Easier to be visually recognized" in the present embodiment includes displaying such that the item highly likely to be selected is closer to the operation position than the other items, highlighting the item highly likely to be selected as compared with the other items, and the like. A method for highlighting the item as compared with the other items includes making the display area of the item highly likely to be selected larger than that of the other items, displaying the item highly likely to be selected with a color of higher intensity than that of the other items, rimming the item highly likely to be selected with a thicker line than that of the other items, and the like.

Typically, the possibility of each item being selected is calculated such that the possibility of the item representing the input-uncompleted image is higher as described above. Alternatively, the possibility of each item being selected may be preset at the time of design. Alternatively, the possibility of each item being selected may be calculated such that the possibility of the items representing the images defined in aforementioned image table 50 (see FIG. 24) is higher. Alternatively, the possibility of each item being selected may be calculated such that the possibility of the items representing the images defined in aforementioned set value table 52 (see FIG. 24) is higher than that of the other items.

[Control Structure]

Figure 28:
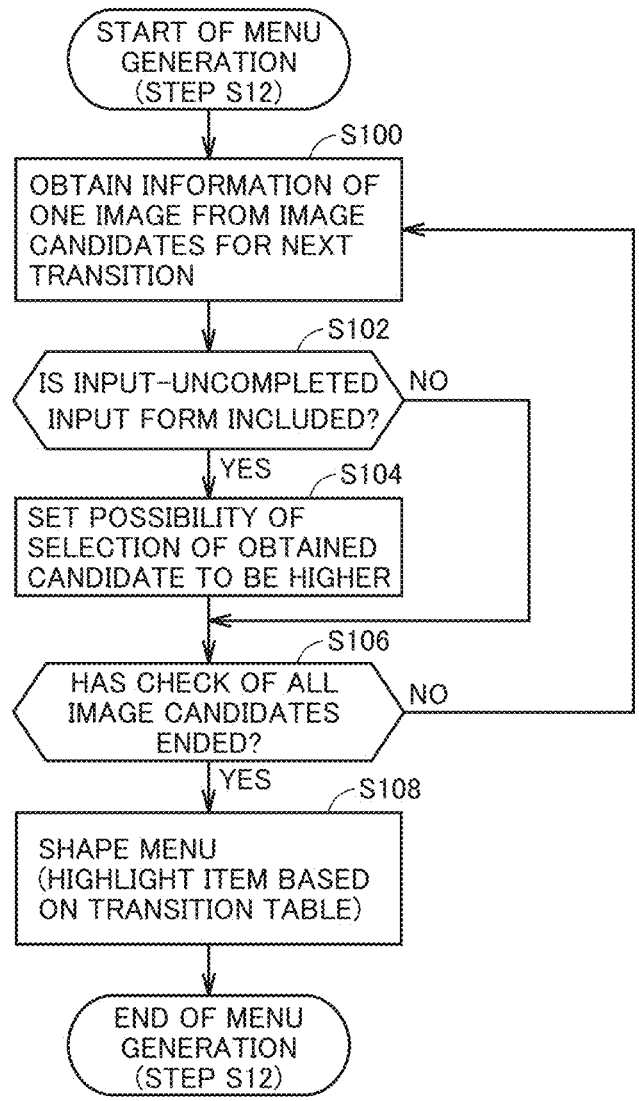
FIG. 28 is a flowchart showing a part of a process executed by the image forming apparatus according to the tenth embodiment.

A control structure of image forming apparatus 100J will be described with reference to FIG. 28. FIG. 28 is a flowchart showing a part of a process executed by image forming apparatus 100J. More specifically, the process in FIG. 28 is a flowchart showing in detail the menu generation process shown in step S12 in FIG. 7. The process in FIG. 28 is implemented by CPU 10A (see FIG. 5) of image forming apparatus 100J executing a program. In another aspect, a part or all of the process may be executed by a circuit element or the other hardware.

In step S100, CPU 10A obtains one image that is a candidate for next transition, from the images shown in aforementioned candidate table 54 (see FIG. 24). In step S102, CPU 10A determines whether or not the image obtained in step S100 includes an input-uncompleted input form. If CPU 10A determines that the image obtained in step S100 includes the input-uncompleted input form (YES in step S102), CPU 10A switches control to step S104. If not (NO in step S102), CPU 10A switches control to step S106.

In step S104, CPU 10A sets the possibility of selection of the candidate obtained in step S100 to be higher. Typically, this possibility is shown by likelihood and is calculated in accordance with the degree of the input to the input form. For example, the likelihood is calculated to become higher as uninput information to the input form becomes more. As one example, the likelihood is managed in candidate table 54. CPU 10A associates the image candidate obtained in step S100 with the calculated likelihood, and writes the image candidate into candidate table 54.

In step S106, CPU 10A determines whether or not check of all image candidates shown in candidate table 54 has ended. If CPU 10A determines that check of all image candidates shown in candidate table 54 has ended (YES in step S106), CPU 10A switches control to step S108. If not (NO in step S106), CPU 10A executes the process in step S100 again.

In step S108, CPU 10A as generating unit 120 (see FIG. 6) shapes the menu based on the likelihood of selection of each image shown in candidate table 54. More specifically, CPU 10A shapes the menu such that an image having a higher likelihood is easier to be visually recognized by the user.

[Summary]

As described above, image forming apparatus 100J according to the present embodiment displays the items in the menu such that the item that is more likely to be selected is easier to be visually recognized. As a result, the operability at the time of selection of the menu can be further enhanced in image forming apparatus 100J.

Eleventh Embodiment

[Overview]

Image forming apparatus 100A according to the first embodiment has uniformly displayed the candidates shown in the menu. In contrast, an image forming apparatus 100K according to an eleventh embodiment displays the image candidates such that a candidate that is less likely to be selected by the user is more difficult to be visually recognized than the other image candidates.

Figure 29:
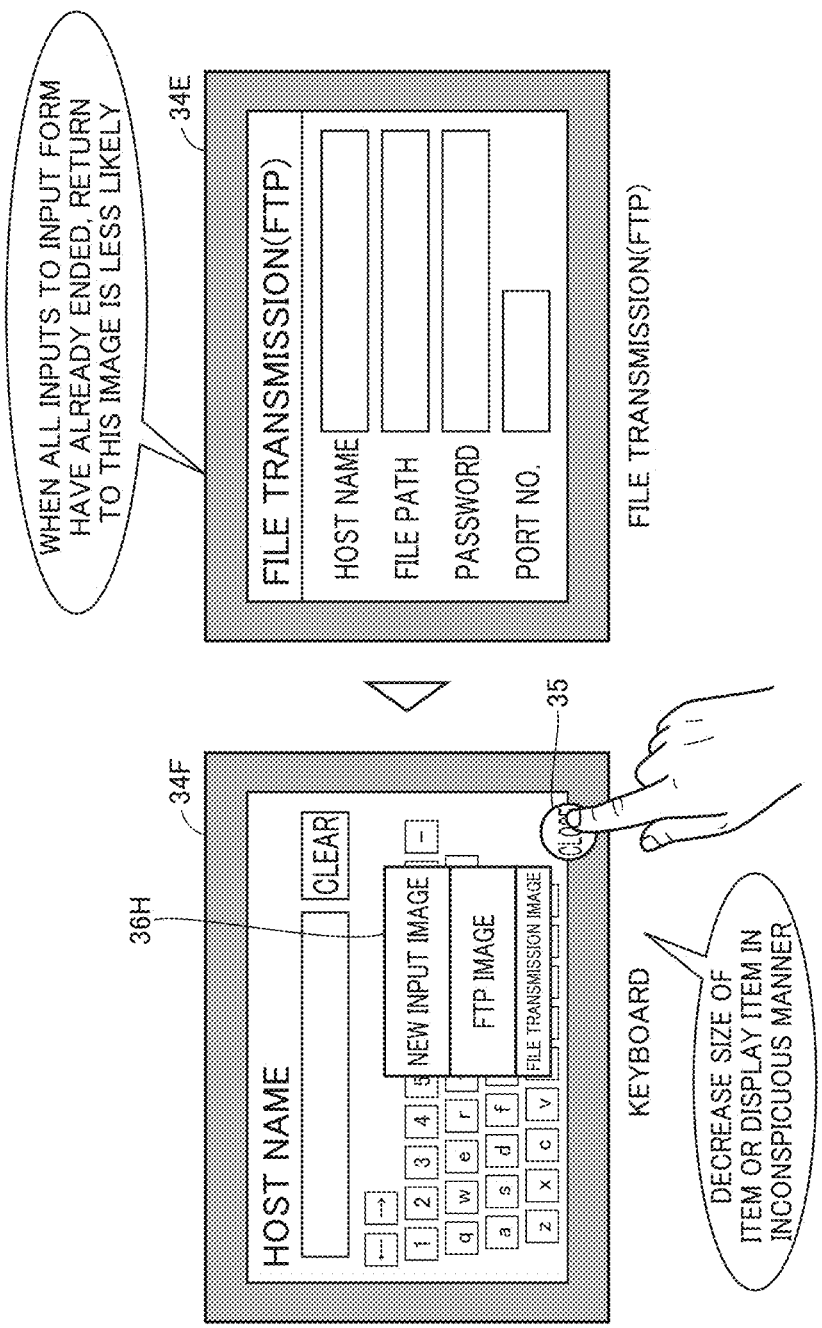
FIG. 29 is a diagram showing a specific example of the display manner of the menu in an image forming apparatus according to an eleventh embodiment.

An overview of image forming apparatus 100K according to the eleventh embodiment will be described below with reference to FIG. 29. FIG. 29 is a diagram showing a specific example of the display manner of the menu in image forming apparatus 100K according to the eleventh embodiment. Since the remaining points such as a hardware configuration of image forming apparatus 100K are the same as those of image forming apparatus 100A according to the first embodiment, description thereof will not be repeated.

As shown in FIG. 29, the user is assumed to sequentially open images 34C to 34F in the process of performing the operation for transmitting scan data to the other device. In this process, the user is assumed to open image 34F after an input to image 34E is completed. At this time, the user is less likely to open input-completed image 34E next to image 34F. Like a menu 36H shown in FIG. 29, in order to allow the user not to easily select image 34E, image forming apparatus 100K displays the items such that the item representing image 34E that is less likely to be selected is more difficult to be visually recognized than the items representing the other images 34C and 34D.

As described above, image forming apparatus 100K displays the image candidates such that the image candidate that is less likely to be selected by the user, of the image candidates shown in the menu, is more difficult to be visually recognized than the other image candidates. As a result, the operability at the time of selection of the menu is further enhanced in image forming apparatus 100K.

"More difficult to be visually recognized" in the present embodiment includes, for example, displaying such that the item less likely to be selected is more distant than the other items from the position where the unnecessary operation was accepted, displaying the item less likely to be selected in a more inconspicuous manner than the other items, and the like. A method for displaying the item in a more inconspicuous manner than the other items includes making the display area of the item less likely to be selected smaller than that of the other items, displaying the item less likely to be selected with a color of lower intensity than that of the other items, making the transparency of the item less likely to be selected higher than that of the other items (such as, for example, displaying the item in a translucent manner), and the like.

Typically, the possibility of each item being selected is calculated such that the possibility of the item representing the input-completed image is lower as described above. Alternatively, the possibility of each item being selected is preset. Alternatively, the possibility of each item being selected may be calculated such that the possibility of the items representing the images not defined in image table 50 (see FIG. 24) is lower. Alternatively, the possibility of each item being selected may be calculated such that the possibility of the items representing the images not defined in set value table 52 (see FIG. 24) is lower than that of the other items.

[Control Structure]

Figure 30:
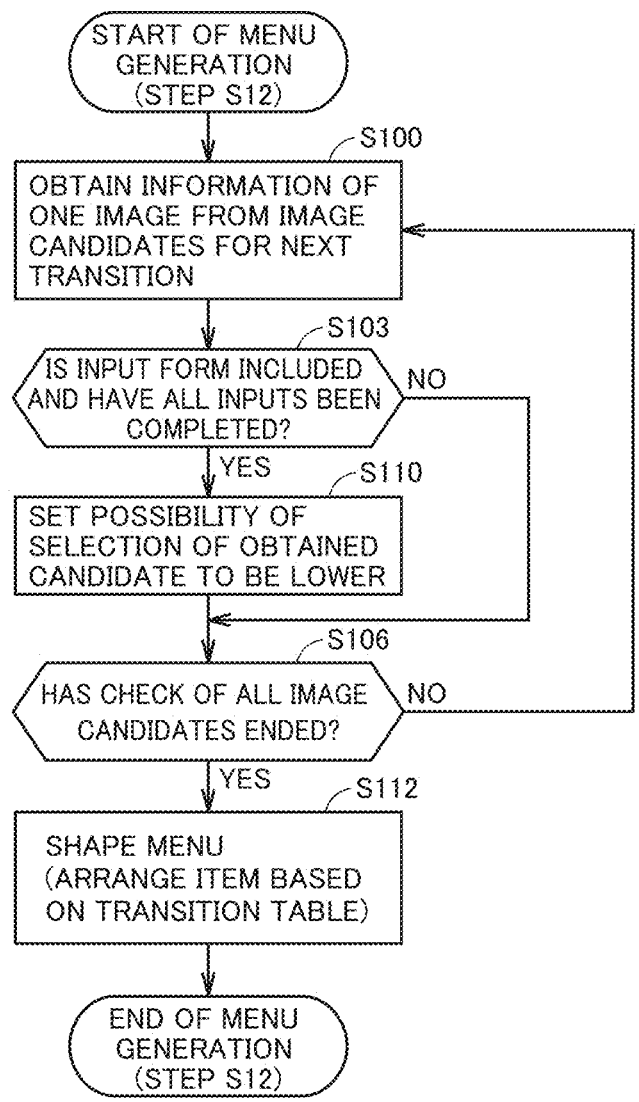
FIG. 30 is a flowchart showing a part of a process executed by the image forming apparatus according to the eleventh embodiment.

A control structure of image forming apparatus 100K will be described with reference to FIG. 30. FIG. 30 is a flowchart showing a part of a process executed by image forming apparatus 100K. More specifically, the process in FIG. 30 is a flowchart showing in detail the menu generation process shown in step S12 in FIG. 7. The process in FIG. 30 is implemented by CPU 10A (see FIG. 5) of image forming apparatus 100K executing a program. In another aspect, a part or all of the process may be executed by a circuit element or the other hardware. Since the process in the steps other than steps S103, S110 and S112 shown in FIG. 30 is the same as the process shown in FIG. 28, description will not be repeated.

In step S103, CPU 10A determines whether or not the image obtained in step S100 includes the input form and the input to the input form has been completed. If CPU 10A determines that the image obtained in step S100 includes the input form and the input to the input form has been completed (YES in step S103), CPU 10A switches control to step S110. If not (NO in step S103), CPU 10A switches control to step S106.

In step S110, CPU 10A sets the possibility of selection of the candidate obtained in step S100 to be lower. Typically, this possibility is shown by likelihood and is calculated in accordance with the degree of the input to the input form. For example, the likelihood is calculated to become lower as uninput information to the input form becomes less. As one example, the likelihood is managed in candidate table 54. CPU 10A associates the image candidate obtained in step S100 with the calculated likelihood, and writes the image candidate into candidate table 54.

In step S112, CPU 10A as generating unit 120 (see FIG. 6) shapes the menu based on the likelihood of selection of each image shown in candidate table 54. More specifically, CPU 10A shapes the menu such that an image having a lower likelihood is more difficult to be visually recognized by the user.

[Summary]

As described above, image forming apparatus 100K according to the present embodiment displays the items in the menu such that the item that is less likely to be selected is more difficult to be visually recognized. As a result, the operability at the time of selection of the menu can be further enhanced in image forming apparatus 100K.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus, comprising:
   a display; and
   a hardware processor configured to:
      accept an operation indicating that display of an image currently displayed on said display is unnecessary, wherein said operation includes at least an input to close said currently displayed image;
      generate, based on said operation, a menu showing image candidates to which transition from said currently-displayed image can be made;
      display said generated menu on said currently-displayed image;
      accept an operation for selecting a particular image from said candidates shown in said generated menu displayed on said currently-displayed image; and
      display said selected particular image on said display based on said operation for selecting.

2. The image forming apparatus according to claim 1, wherein based on acceptance of said operation indicating that display of said currently-displayed image is unnecessary, said hardware processor closes said currently-displayed image.

3. The image forming apparatus according to claim 1, wherein said currently-displayed image and said image candidates to which transition from said currently-displayed image can be made have a hierarchical relationship.

4. The image forming apparatus according to claim 3, wherein said hardware processor generates said menu showing, as said candidates, an image located in a higher hierarchy than that of said currently-displayed image.

5. The image forming apparatus according to claim 3, wherein said operation indicating that display of said currently-displayed image is unnecessary includes an operation for causing transition from a hierarchy of said currently-displayed image to another hierarchy to take place.

6. The image forming apparatus according to claim 1, wherein the images displayed on said display are displayed in such a manner that at least a part thereof are overlapped with one another.

7. The image forming apparatus according to claim 1, wherein said hardware processor displays said menu on said display when the number of said candidates is equal to or larger than a prescribed number, and does not display said menu on said display when the number of said candidates is smaller than said prescribed number.

8. The image forming apparatus according to claim 1,
   wherein said hardware processor controls to display a button for accepting said operation indicating that display of said currently-displayed image is unnecessary, and measures a time period during which said button is pressed, and
   wherein said hardware processor displays said menu on said display when said time period is equal to or longer than a prescribed time period, and does not display said menu on said display when said time period is shorter than said prescribed time period.

9. The image forming apparatus according to claim 1, wherein said hardware processor displays said menu near a position where said operation indicating that display of said currently-displayed image is unnecessary was accepted.

10. The image forming apparatus according to claim 9, wherein said hardware processor displays said candidates radially about said position.

11. The image forming apparatus according to claim 9, wherein
said currently-displayed image and said image candidates to which transition from said currently-displayed image can be made have a hierarchical relationship, and
said hardware processor displays said image candidates such that an image candidate having the more distant hierarchical relationship, of said image candidates shown in said menu, is more distant from said position.

12. The image forming apparatus according to claim 1, wherein said operation for selecting a particular image includes at least one of a drag operation and a tap operation.

13. The image forming apparatus according to claim 1, wherein said hardware processor is configured to accept an operation for provisionally selecting a particular image from said image candidates shown in said menu, and thereafter, accept an operation for determining said particular image as an image displayed on said display, and
wherein said hardware processor displays a thumbnail of said particular image on said display while said particular image is provisionally selected.

14. The image forming apparatus according to claim 1, further comprising:
a storage for storing first image information that associates an image candidate to which transition is highly likely to be made with each image, and second image information that associates an image candidate to which transition is highly likely to be made with each set value set in said image forming apparatus; wherein
the hardware processor is further configured to identify the image associated with said currently-displayed image based on said first image information, and identify the image associated with the set value set in said image forming apparatus based on said second image information, wherein
said hardware processor generates said menu by using, as said candidates, the identified image based on said first image information and the identified image based on said second image information.

15. The image forming apparatus according to claim 1, wherein said hardware processor displays said image candidates such that an image candidate that is more likely to be selected by a user, of said image candidates shown in said menu, is easier to be visually recognized than the other image candidates.

16. The image forming apparatus according to claim 1, wherein said hardware processor displays said image candidates such that an image candidate that is less likely to be selected by a user, of said image candidates shown in said menu, is more difficult to be visually recognized than the other image candidates.

17. The image forming apparatus according to claim 1, wherein said hardware processor is configured to accept an operation for provisionally selecting a particular image from said image candidates shown in said generated menu, and thereafter, accept an operation for determining said particular image as an image displayed on said display.

18. A method for controlling an image forming apparatus, comprising:
accepting an operation indicating that display of an image currently displayed on a display is unnecessary, wherein said operation includes at least an input to close said currently displayed image;
generating, based on said operation, a menu showing image candidates to which transition from said currently-displayed image can be made;
displaying said generated menu on said currently-displayed image;
accepting an operation for selecting a particular image from said candidates shown in said generated menu displayed on said currently-displayed image; and
displaying said selected particular image on said display based on said operation for selecting.

19. A non-transitory storage medium encoded with a computer readable program executed by a computer, said program causing said computer to execute:
accepting an operation indicating that display of an image currently displayed on said display is unnecessary, wherein said operation includes at least an input to close said currently displayed image;
generating, based on said operation, a menu showing image candidates to which transition from said currently-displayed image can be made;
displaying said generated menu on said currently-displayed image;
accepting an operation for selecting a particular image from said candidates shown in said generated menu displayed on said currently-displayed image; and
displaying said particular image on said display based on said operation for selecting.

* * * * *